US011675795B2

(12) United States Patent
Yin et al.

(10) Patent No.: US 11,675,795 B2
(45) Date of Patent: Jun. 13, 2023

(54) METHOD AND SYSTEM FOR RANKING SEARCH CONTENT

(71) Applicant: YAHOO ASSETS LLC, Dulles, VA (US)

(72) Inventors: Dawei Yin, San Jose, CA (US);
Pengyuan Wang, Sunnyvale, CA (US);
Hua Ouyang, Sunnyvale, CA (US); Yi Chang, Sunnyvale, CA (US);
Jean-Marc Langlois, Menlo Park, CA (US)

(73) Assignee: YAHOO ASSETS LLC, New York, NY (US)

( * ) Notice: Subject to any disclaimer, the term of this patent is extended or adjusted under 35 U.S.C. 154(b) by 264 days.

(21) Appl. No.: 14/959,122

(22) Filed: Dec. 4, 2015

(65) Prior Publication Data
US 2016/0335263 A1    Nov. 17, 2016

Related U.S. Application Data

(60) Provisional application No. 62/162,181, filed on May 15, 2015.

(51) Int. Cl.
*G06F 7/00* (2006.01)
*G06F 16/2457* (2019.01)
*G06F 16/9535* (2019.01)

(52) U.S. Cl.
CPC .... *G06F 16/24578* (2019.01); *G06F 16/9535* (2019.01)

(58) Field of Classification Search
CPC .......... G06F 17/30867; G06F 17/3053; G06F 16/33; G06F 16/9535; G06F 16/24578

USPC ................. 707/722, 723, 727, 730
See application file for complete search history.

(56) References Cited

U.S. PATENT DOCUMENTS

| | | | | |
|---|---|---|---|---|
| 8,078,625 B1* | 12/2011 | Zhang | ........... | G06F 16/353 |
| | | | | 707/748 |
| 8,185,523 B2* | 5/2012 | Lu | ............. | G06F 16/248 |
| | | | | 707/723 |
| 8,229,873 B1* | 7/2012 | Dolan | ........... | G06N 5/048 |
| | | | | 706/45 |
| 10,037,357 B1* | 7/2018 | Donaker | ...... | G06F 16/2457 |
| 2008/0059508 A1* | 3/2008 | Lu | ............. | G06F 16/353 |
| | | | | 707/999.102 |
| 2008/0133540 A1* | 6/2008 | Hubbard | ..... | H04L 63/1483 |
| 2008/0270376 A1* | 10/2008 | Svore | ......... | G06F 16/958 |
| | | | | 707/999.005 |
| 2009/0132515 A1* | 5/2009 | Lu | ............. | G06N 5/003 |
| | | | | 707/999.005 |
| 2011/0246457 A1* | 10/2011 | Dong | .......... | G06Q 10/06 |
| | | | | 707/723 |
| 2012/0158702 A1* | 6/2012 | Kumar | ........ | G06F 16/215 |
| | | | | 707/723 |

(Continued)

*Primary Examiner* — Md I Uddin
(74) *Attorney, Agent, or Firm* — Venable LLP

(57) ABSTRACT

The present teaching relates to ranking search content. In one example, a plurality of documents is received to be ranked with respect to a query. Features are extracted from the query and the plurality of documents. The plurality of documents is ranked based on a ranking model and the extracted features. The ranking model is derived to remove one or more documents from the plurality of documents that are less relevant to the query and order remaining documents based on their relevance to the query. The ordered remaining documents are provided as a search result with respect to the query.

12 Claims, 16 Drawing Sheets

(56) References Cited

U.S. PATENT DOCUMENTS

| | | | |
|---|---|---|---|
| 2012/0166530 A1* | 6/2012 | Tseng | G06Q 30/0272 709/204 |
| 2013/0132378 A1* | 5/2013 | Gilad-Bachrach | G06F 16/00 707/E17.084 |
| 2014/0025668 A1* | 1/2014 | Lin | G06F 16/24578 707/723 |
| 2014/0074811 A1* | 3/2014 | Wang | G06F 16/951 707/706 |
| 2014/0136536 A1* | 5/2014 | Ramsey | G06F 16/248 707/733 |
| 2015/0161255 A1* | 6/2015 | Battle | H04L 67/30 707/706 |
| 2015/0161267 A1* | 6/2015 | Sugawara | G06F 16/9535 707/E17.014 |
| 2015/0199361 A1* | 7/2015 | McDonnell | G06F 16/337 707/723 |
| 2015/0227972 A1* | 8/2015 | Tang | G06Q 30/0255 705/14.53 |
| 2015/0269156 A1* | 9/2015 | Awadallah | G06F 16/24578 707/732 |
| 2015/0293976 A1* | 10/2015 | Guo | G06F 16/9535 707/706 |
| 2015/0324434 A1* | 11/2015 | Greenwood | G06F 16/00 707/722 |
| 2016/0026727 A1* | 1/2016 | Bar-Yossef | G06F 16/9535 707/723 |
| 2016/0124958 A1* | 5/2016 | Sinha | G06F 16/9535 707/733 |
| 2016/0142439 A1* | 5/2016 | Goutal | G06N 20/00 726/22 |
| 2016/0189059 A1* | 6/2016 | Ishii | G06N 20/00 706/12 |
| 2016/0314203 A1* | 10/2016 | Wickenkamp | G06F 16/735 |
| 2016/0335372 A1* | 11/2016 | Latzina | G06F 16/3334 |

* cited by examiner

METHOD AND SYSTEM FOR RANKING SEARCH CONTENT

CROSS-REFERENCE TO RELATED APPLICATION

The present application claims priority to U.S. Provisional Patent Application No. 62/162,181, filed May 15, 2015, entitled "METHOD AND SYSTEM FOR RANKING SEARCH CONTENT," which is incorporated herein by reference in its entirety.

1. Technical Field

The present teaching relates to methods, systems and programming for information retrieval. Particularly, the present teaching is directed to methods, systems, and programming for ranking search content in response to a query.

2. Discussion of Technical Background

A search engine is one type of information retrieval system that is designed to help users search for and obtain access to information that is stored in a computer system or across a network of computers. In response to a query from a user, a search engine can search different sources online to obtain search results matching the query. The search results are usually ranked with a machine learning model, which is called "learning to rank," before being provided to the user.

Existing learning to rank technique ignores the percentage of bad or irrelevant results in the search results. The percentage of bad results is critical for search quality. When users see a bad result at a top ranking position, they may give up the current search engine and switch to its competitors. In realistic scenario, e.g. at a commercial search engine, given a query, the number of irrelevant results is almost infinite. Therefore, it is infeasible to put all irrelevant results into training data. With existing learning to rank techniques, the percentage of bad results at top ranking positions is higher than expected.

Therefore, a desire exists to develop a ranking model to overcome the above drawbacks.

SUMMARY

The teachings disclosed herein relate to methods, systems, and programming for information retrieval. More particularly, the present teaching relates to methods, systems, and programming for ranking search content in response to a query.

In one example, a method, implemented on a machine having at least one processor, storage, and a communication platform connected to a network for ranking search content, is disclosed. A plurality of documents is received to be ranked with respect to a query. Features are extracted from the query and the plurality of documents. The plurality of documents is ranked based on a ranking model and the extracted features. The ranking model is derived to remove one or more documents from the plurality of documents that are less relevant to the query and order remaining documents based on their relevance to the query. The ordered remaining documents are provided as a search result with respect to the query.

In a different example, a system having at least one processor, storage, and a communication platform connected to a network for ranking search content, is disclosed. The system comprises a query and document analyzer configured for receiving a plurality of documents to be ranked with respect to a query; a feature extractor configured for extracting features from the query and the plurality of documents; a search result ranking unit configured for ranking the plurality of documents based on a ranking model and the extracted features, wherein the ranking model is derived to remove one or more documents from the plurality of documents that are less relevant to the query and order remaining documents based on their relevance to the query; and a search result filter configured for providing the ordered remaining documents as a search result with respect to the query.

Other concepts relate to software for implementing the ranking of search results. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine-readable, non-transitory and tangible medium having information recorded thereon for ranking search content is disclosed. The information, when read by the machine, causes the machine to perform the following: receiving a plurality of documents to be ranked with respect to a query; extracting features from the query and the plurality of documents; ranking the plurality of documents based on a ranking model and the extracted features, wherein the ranking model is derived to remove one or more documents from the plurality of documents that are less relevant to the query and order remaining documents based on their relevance to the query; and providing the ordered remaining documents as a search result with respect to the query.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of ranking search content, realized as a specialized and networked system by utilizing one or more computing devices (e.g., mobile phone, personal computer, etc.) and network communications (wired or wireless). The method and system as disclosed herein aim at ranking search content in an effective and efficient manner.

Given a query submitted to a search engine, the number of irrelevant results is almost infinite and dominates the relevant results. Thus, it is infeasible to put all irrelevant results into training data. As a result, given a query, the percentage of bad results at top positions is very high for existing ranking models. The percentage of bad results is one of the most important metric for search quality. When users see embarrassing results at top position, they will give up the current search engine and switch to its competitors.

Motivated by this challenge, the teachings presented herein provide a system or service that utilizes a unified ranking model based on gradient boosting. The system employs gradient boosting trees with logistic loss to classify relevant and irrelevant uniform resource locators (URLs) referred to searched documents, given a query. This may give a binary classification of the URLs based on features extracted from the query, URL and query/URL pairs. The binary classification although cannot rank the URLs perfectly, it is able to effectively control the embarrassing results at top positions, since it is a model focusing on a decision boundary of good and bad results. To further distinguish good results, the system may incorporate assessment information (e.g. Perfect, Excellent and Good) into the model to fine-tune and ranking the good results, by scaling gradients of query/URL pairs in different levels according to their respective assessment information. Experiments on offline data sets show that the unified framework in present teaching can outperform the state of the art learning to rank algorithm. Online evaluation shows that the unified framework in present teaching can decrease the percent of bad URLs by 50%, and meanwhile can increase relevance by 5% in terms of DCG5 (i.e., the discounted cumulative gain at rank 5).

Figure 1:
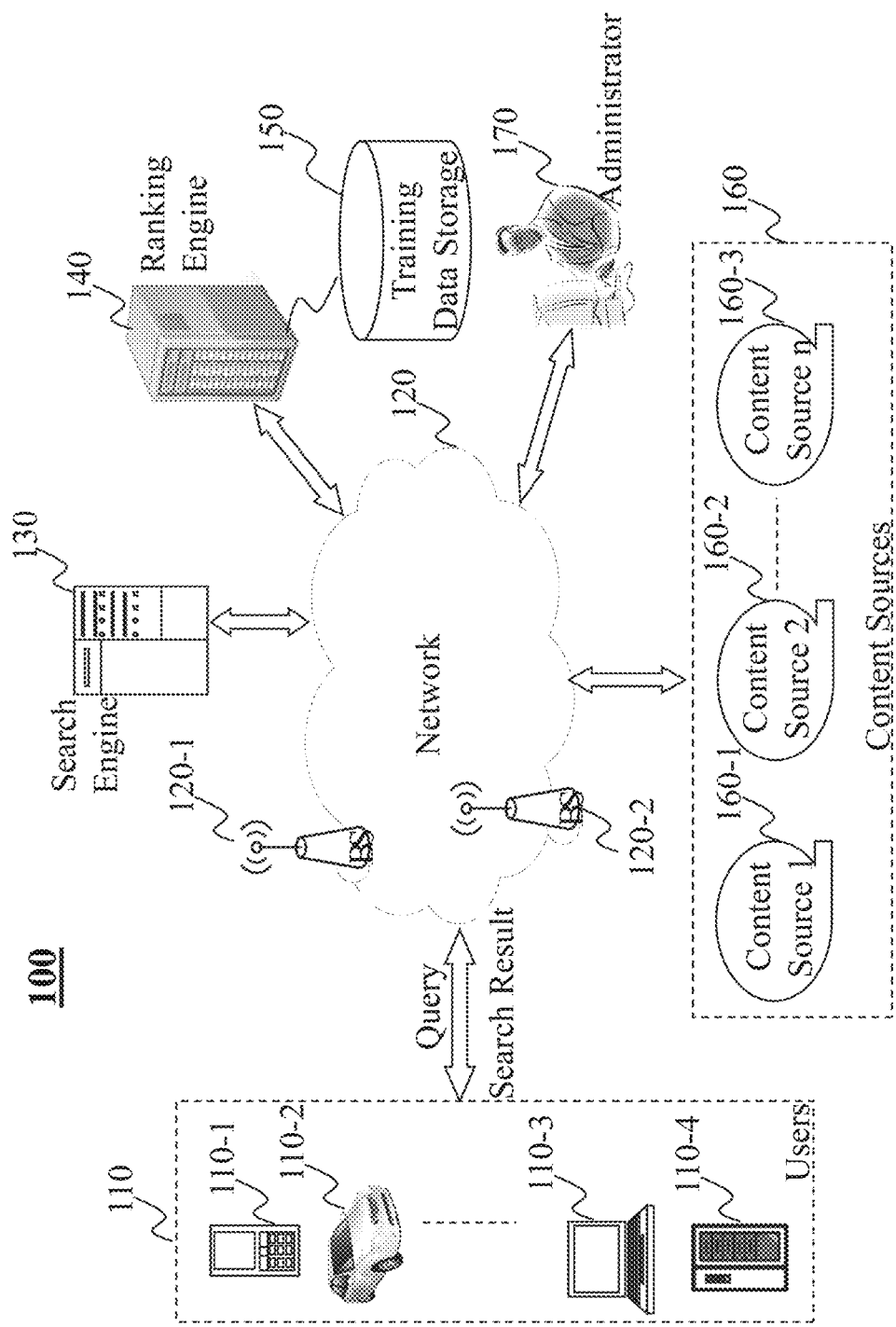
FIG. 1 is a high level depiction of an exemplary networked environment for ranking search content, according to an embodiment of the present teaching.

FIG. 1 is a high level depiction of an exemplary networked environment for ranking search content, according to an embodiment of the present teaching. In FIG. 1, the exemplary system 100 includes users 110, a network 120, a search engine 130, a ranking engine 140, a training data storage 150, content sources 160 including content source 1 160-1, content source 2 160-2, . . . , content source n 160-3, and an administrator 170. The network 120 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 120-1, . . . , 120-2, through which a data source may connect to the network in order to transmit information via the network.

Users 110 may be of different types such as users connected to the network via desktop connections (110-4), users connecting to the network via wireless connections such as through a laptop (110-3), a handheld device (110-1), or a built-in device in a motor vehicle (110-2). A user may send a query to the search engine 130 via the network 120 and receive a search result from the search engine 130 through the network 120. The user's query may be handled by the search engine 130 which may search documents based on the query from the content sources 160 and/or other sources on the network 120. The search engine 130 may then send a request to the ranking engine 140 for ranking and/or filtering searched documents at the search engine 130 in response to the query.

To facilitate good data retrieval, the ranking engine 140 may utilize training data in the training data storage 150 to train a ranking model that aims at both removing bad results and ranking good results at the same time. The ranking engine 140 may receive a request for ranking search results from the search engine 130 with information about query and searched documents. With the trained ranking model, the ranking engine 140 can remove irrelevant documents and rank relevant documents regarding the query, based on features extracted from the query and the documents. The features may represent, e.g. popularity of a document on the web, textual relevance between a document and the query, and the user's typical click behavior regarding a document and the query, etc.

The training data storage 150, which can be centralized or distributed, archives massive amount of training data that includes but not limited to data about queries, URLs, query/URL pairs, and/or assessment data for each query/URL pair.

In some embodiments, the training data can be obtained based on queries submitted to one or more search engines.

In addition to a user at 110, a different type of user such as 170, which can be a system operator or an administrator, may also be able to interact with the ranking engine 140 for different administrative jobs such as assessing training data selected from the training data storage 150, determining or updating ranking class configuration, and/or determining or updating training models and parameters for training the ranking model at the ranking engine 140. In some embodiments, user 170 may be classified to have a higher privilege to manage the training data storage 150 on more operational issues than user 110.

Based on the trained ranking model, the ranking engine 140 can remove bad results and provide ranked good results to the search engine 130. The search engine 130 may then generate a response based on the ranked good results and provide the response to the user via the network 120.

Figure 2:
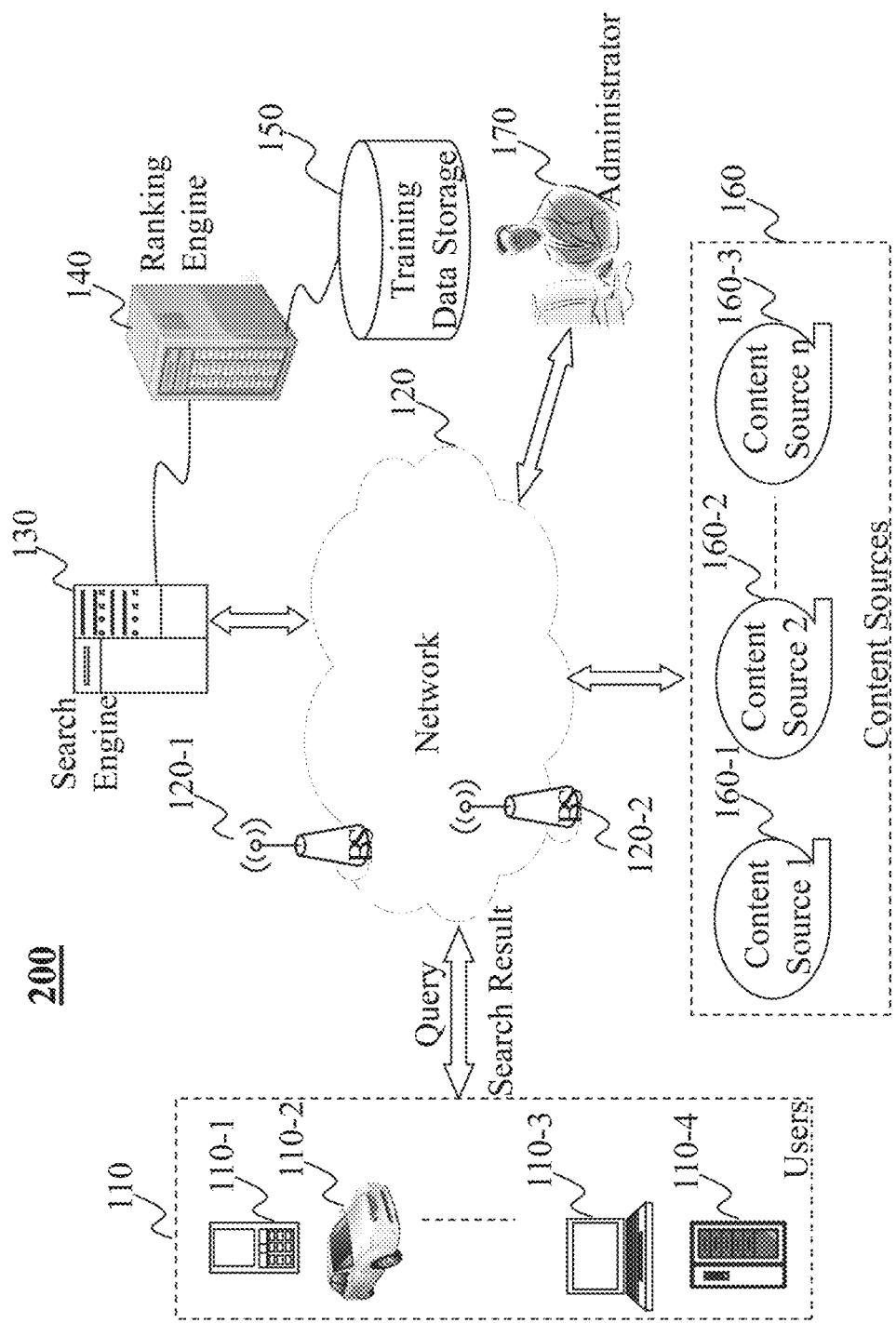
FIG. 2 is a high level depiction of another exemplary networked environment for ranking search content, according to an embodiment of the present teaching.

FIG. 2 presents a similar system configuration as what is shown in FIG. 1 except that the ranking engine 140 is now configured as a backend system of the search engine 130. In some embodiments, there may be yet another different system configuration in which the ranking engine 140 may be deployed (now shown). In this embodiment, the user 170 is a backend operator of the search engine 130 and can interact with the ranking engine 140 via an internal or proprietary network connection (not shown). It is noted that different configurations as illustrated in FIG. 1 and FIG. 2 can also be mixed in any manner that is appropriate for a particular application scenario.

Figure 3:
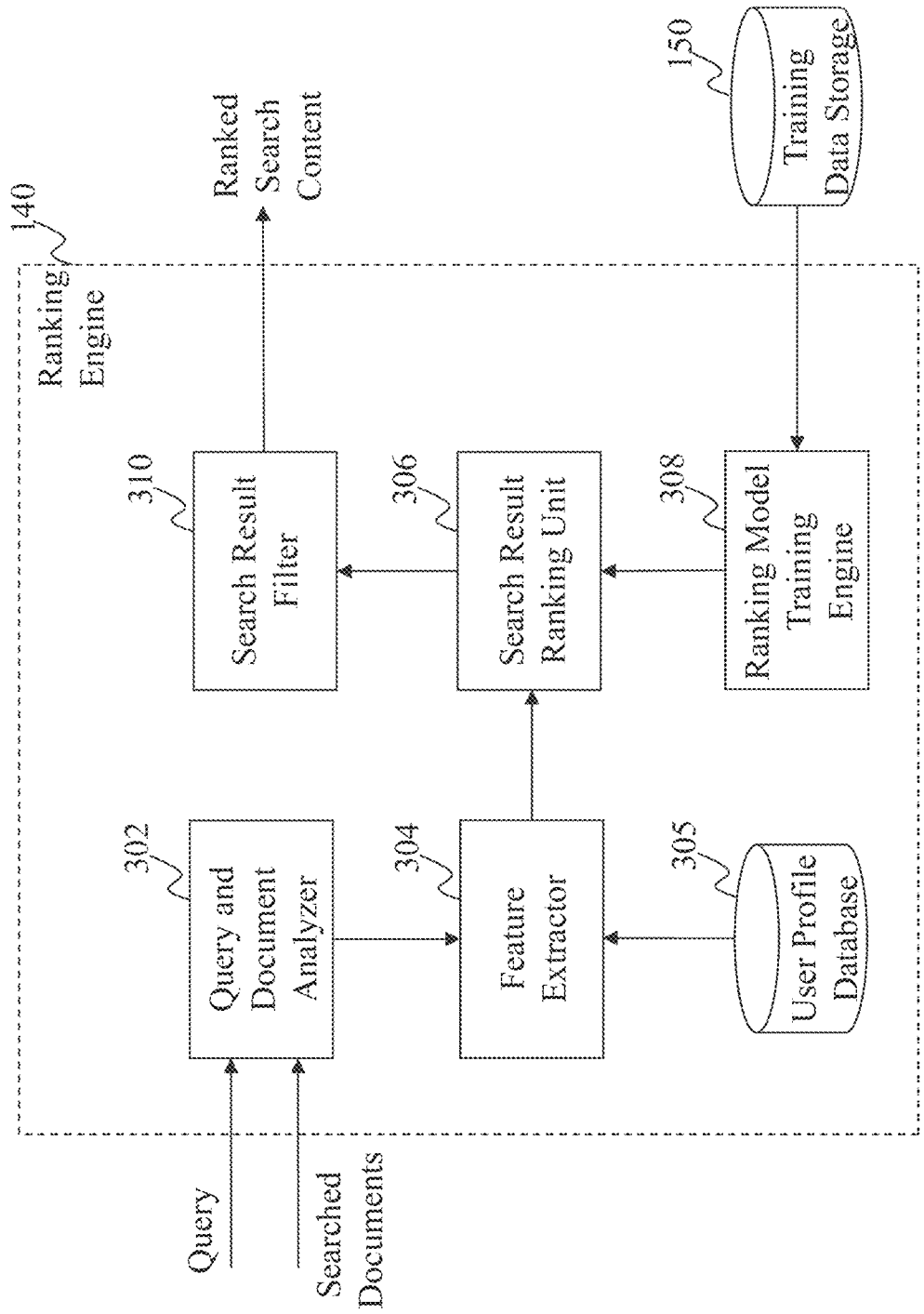
FIG. 3 illustrates an exemplary diagram of a ranking engine, according to an embodiment of the present teaching.

FIG. 3 illustrates an exemplary diagram of a ranking engine 140, according to an embodiment of the present teaching. In this example, the ranking engine 140 comprises a query and document analyzer 302, a feature extractor 304, a user profile database 305, a search result ranking unit 306, a ranking model training engine 308, and a search result filter 310.

The query and document analyzer 302 in this example may receive a request from a search engine, e.g. the search engine 130, for ranking and/or filtering search results regarding a query submitted by a user. The request may include information about the query and searched documents based on the query. In various embodiments, a searched document may be in any proper format, e.g. text, image, video, audio, web, map, etc. The query and document analyzer 302 may analyze the query and the searched documents, e.g. by determining a URL associated with each searched document and forming a query/URL pair for each URL and the query. The query and document analyzer 302 sends information about the query, the URLs, and the query/URL pairs to the feature extractor 304 for feature extraction.

The feature extractor 304 in this example extracts features for each query/URL pair, based on data about the query and the URL. For example, the feature extractor 304 may identify the user submitting the query and retrieve a user profile associated with the user from the user profile database 305. The user profile database 305 in this example is a database within the ranking engine 140 and includes user profiles for different users at various search engines, including the search engine 130. In accordance with various embodiments, the search engine 130 may include its own user profile database, and can provide the user profile with the request to the ranking engine 140.

The feature extractor 304 may also extract features like popularity of a URL on the web, textual relevance between the query and a document referred by the URL, the user's past behavior regarding the document and the query, etc. The feature extractor 304 sends the query/URL pairs and their corresponding extracted features to the search result ranking unit 306.

The search result ranking unit 306 in this example ranks the searched documents or the query/URL pairs based on their respective extracted features, with a trained ranking model determined by the ranking model training engine 308. The ranking model training engine 308 in this example can train a ranking model based on training data from the training data storage 150, either online or offline. The ranking model training engine 308 may send an updated ranking model to the search result ranking unit 306 from time to time.

The ranking model may be trained to map features of a query/URL pair to a score representing the pair's relevance and goodness as a search result. A query/URL pair with a higher score should be ranked higher than a query/URL pair with a lower score. The ranking model training engine 308 may utilize a logistic loss function to give a binary classification of the query/URL pairs. For example, the trained ranking model can map features of a bad result to a negative score and map features of a good result to a positive score. As such, the results or URLs can be classified into two classes (good and bad) at the same time as being ranked.

Based on the trained ranking model, the search result ranking unit 306 may calculate a score for each query/URL pair based on their respective features. In one embodiment, the search result ranking unit 306 may rank the URLs based on their corresponding scores and send the ranked URLs with their scores to the search result filter 310 for filtering. Then, the search result filter 310 may determine a threshold to cut off all URLs with scores below the threshold. For example, if the trained ranking model maps features of a bad result to a negative score and map features of a good result to a positive score, the search result filter 310 may utilize a threshold 0 to remove all bad results or bad URLs. The search result filter 310 may then send the filtered and ranked search content to the search engine 130 in response to the request. In another embodiment (not shown), the search result ranking unit 306 may directly filter or remove a bad result after determining that its score is below the threshold, and then rank the left good results based on their scores. Then, the search result ranking unit 306 may send the filtered and ranked search content to the search engine 130 in response to the request.

Figure 4:
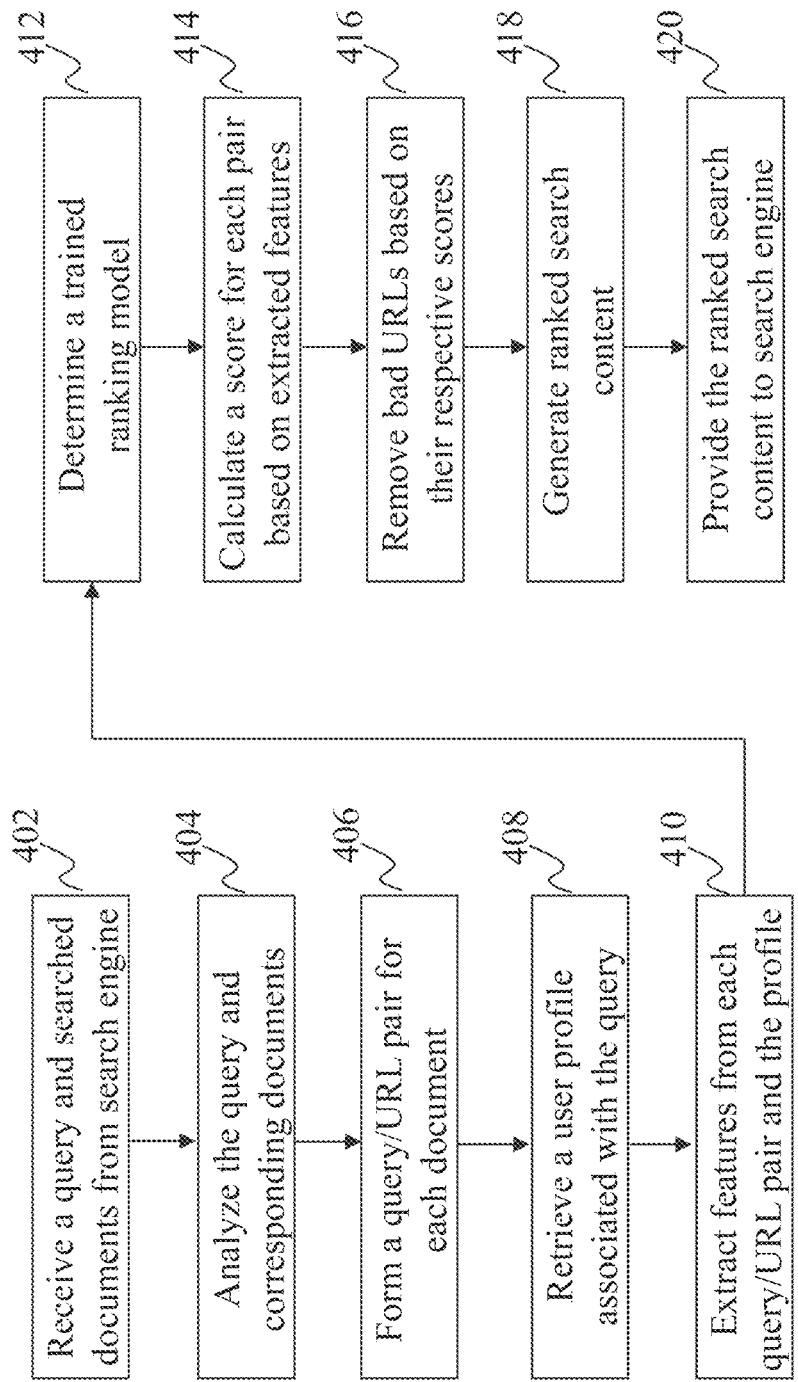
FIG. 4 is a flowchart of an exemplary process performed by a ranking engine, according to an embodiment of the present teaching.

FIG. 4 is a flowchart of an exemplary process performed by a ranking engine, e.g. the ranking engine 140, according to an embodiment of the present teaching. First, a request is received from the search engine 130, together with the query and the searched documents at 402. Then at 404, the query and corresponding documents are analyzed. A query/URL pair is formed at 406 for each document, based on the document's associated URL. A user profile associated with the query and the user submitting the query is retrieved from a database at 408. At 410, features are extracted from each query/URL pair and the user profile. As discussed before, the features may include information about popularity of the URL on the web, textual relevance between a document referred by the URL and the query, and the user's past behavior regarding the URL and the query.

A trained ranking model is determined at 412. As discussed before, the ranking model may be trained based on training data from the training data storage 150. With the trained ranking model, at 414, a score for each query/URL pair is calculated based on its corresponding extracted features. At 416, bad URL(s) are removed based on their respective scores, and a predetermined threshold. Then, ranked search content is generated at 418, by e.g. ranking the left good URLs based on their respective scores. At 420, the ranked search content is sent to the search engine 130. The steps in FIG. 4 may be performed in a different order as shown therein. For example, 418 may be performed before 416 such that the search results are ranked at 418 based on their scores and then filtered at 416.

Figure 5:
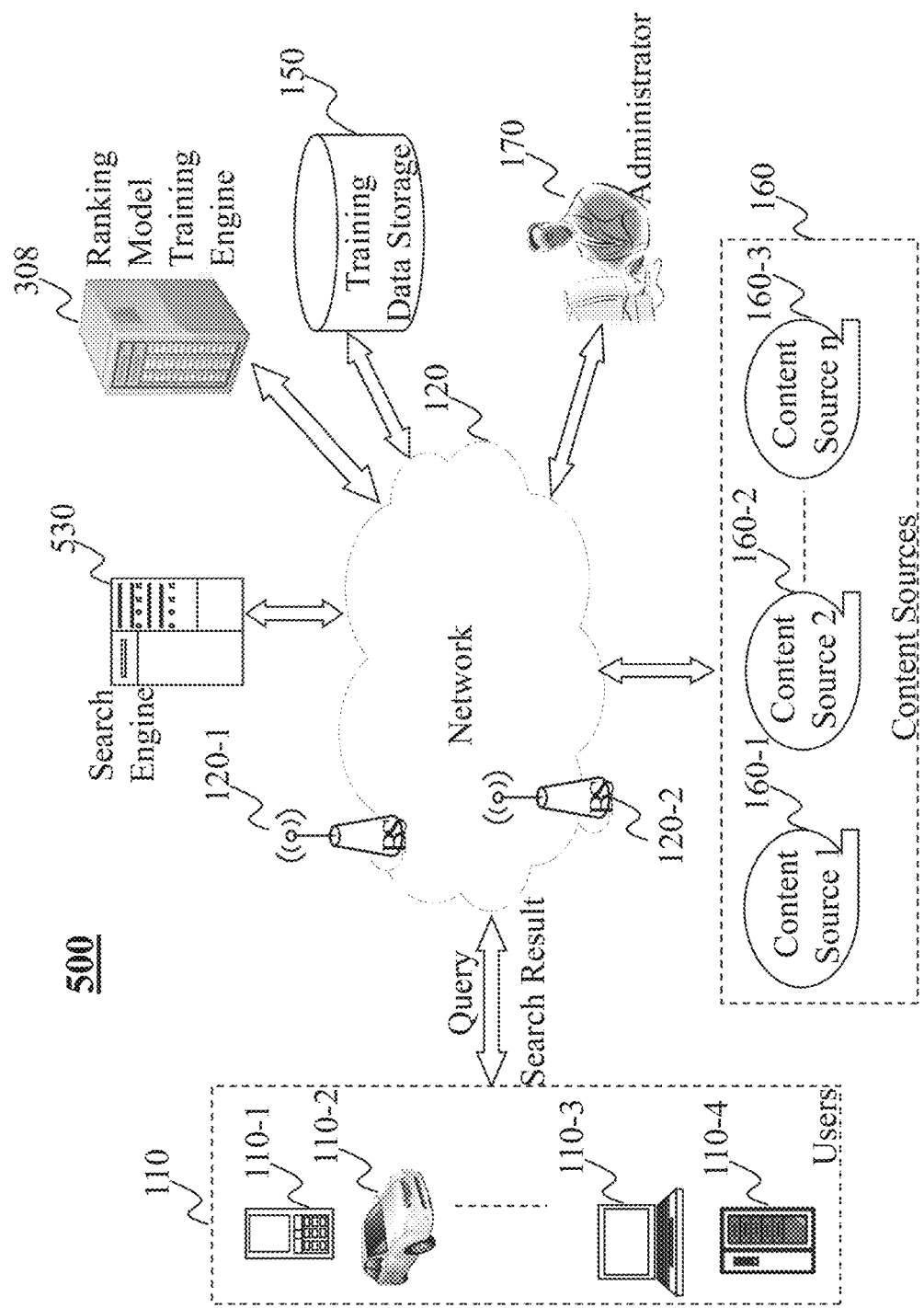
FIG. 5 is a high level depiction of an exemplary networked environment for ranking search content, according to another embodiment of the present teaching.

FIG. 5 is a high level depiction of an exemplary networked environment for ranking search content, according to another embodiment of the present teaching. Different from the exemplary system 100 in FIG. 1, the exemplary system 500 in FIG. 5 includes a search engine 530 that can rank the search results on its own. But the search engine 530 may utilize the ranking model training engine 308 that stands out of the search engine 530 to train the ranking model at the search engine 530. In this case, the ranking model training engine 308 may help different search engines to train their ranking model, based on various requirements. In addition, the training data storage 150 in this example is shared on the network 120.

Figure 6:
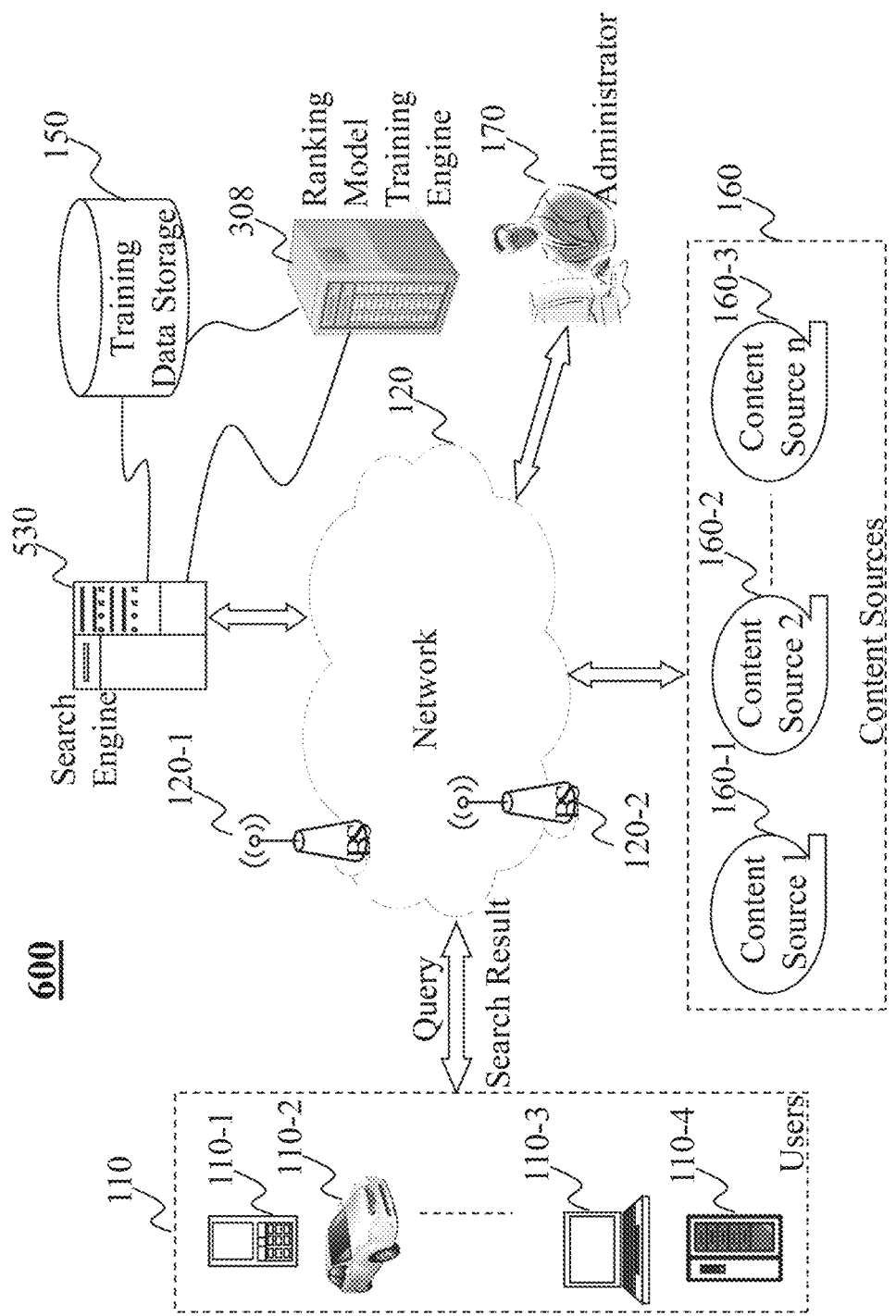
FIG. 6 is a high level depiction of another exemplary networked environment for ranking search content, according to another embodiment of the present teaching.

FIG. 6 presents a similar system configuration as what is shown in FIG. 5 except that the ranking model training engine 308 is now configured as a backend system of the search engine 530 and the training data storage 150 is shared by the ranking model training engine 308 and the search engine 530. In this embedment, the training data storage 150 may include queries received by the search engine 530 and URLs searched by the search engine 530. In some embodiments, there may be yet another different system configuration in which the ranking model training engine 308 may be deployed (now shown). It is noted that different configurations as illustrated in FIG. 5 and FIG. 6 can also be mixed in any manner that is appropriate for a particular application scenario.

Figure 7:
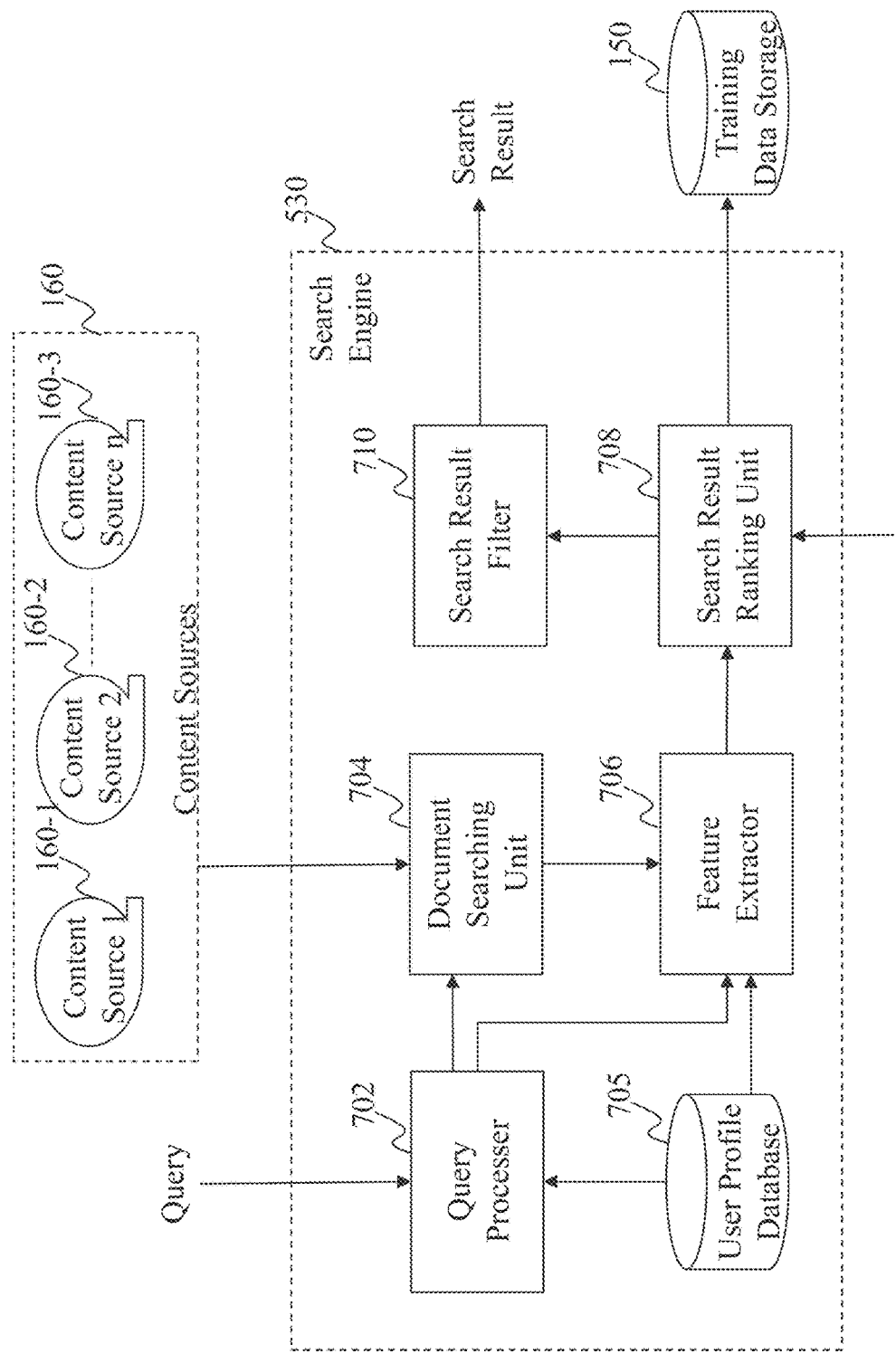
FIG. 7 illustrates an exemplary diagram of a search engine, according to an embodiment of the present teaching.

FIG. 7 illustrates an exemplary diagram of a search engine 530, according to an embodiment of the present teaching. As shown in FIG. 7, the search engine 530 in this example comprises a query processor 702, a document searching unit 704, a feature extractor 706, a user profile database 705, a search result ranking unit 708, and a search result filter 710.

The query processor 702 in this example receives a query from a user, e.g. one of the users 110 in various embodiments. The query processor 702 may analyze the query to identify the user and determine metadata about the query, e.g. query time (morning, afternoon or evening; weekday or weekend), query topic (sports, news, movies, etc.), and query type (web, image, video, map, etc.). The query processor 702 may retrieve a user profile associated with the user from the user profile database 705 and send the user profile together with the query and its metadata to the document searching unit 704.

The document searching unit 704 in this example searches documents online, e.g. from the content sources 160, based on the query. In various embodiments, the document searching unit 704 may search the documents based on the metadata of the query and/or the user profile of the user. In one embodiment, the document searching unit 704 may form a query/URL pair for each searched document referred by a URL. The document searching unit 704 may send information about the query, URLs and the query/URL pairs to the feature extractor 706.

The feature extractor 706 in this example receives information about the query or URLs from both the query processor 702 and the document searching unit 704. In one embodiment, the feature extractor 706 does not receive information directly from the query processor 702, and the document searching unit 704 can forward information from the query processor 702 to the feature extractor 706. In addition to the information about query and URLs, the feature extractor 706 may also receive information about the user, and hence can retrieve the user profile from the user profile database 705. The user profile database 705 in this example is a database within the search engine 530 and includes user profiles for different users of the search engine 530.

The feature extractor 706 may extract features for each query/URL pair, based on data about the query, the URL, and/or the user profile. The features may include popularity of the URL on the web, textual relevance between the query and a document referred by the URL, the user's past behavior regarding the document and the query, etc. The feature extractor 706 sends the query/URL pairs and their corresponding extracted features to the search result ranking unit 708.

The search result ranking unit 708 in this example ranks the searched documents or the query/URL pairs based on their respective extracted features, with a trained ranking model received from the ranking model training engine 308. As discussed before, the ranking model may be trained to map features of a query/URL pair to a score representing the pair's relevance and goodness as a search result. A query/URL pair with a higher score should be ranked higher than a query/URL pair with a lower score. The ranking model training engine 308 may utilize a logistic loss function to give a binary classification of the query/URL pairs. For example, the trained ranking model can map features of a bad result to a negative score and map features of a good result to a positive score. As such, the results or URLs can be classified into two classes (good and bad) at the same time as being ranked.

Based on the trained ranking model, the search result ranking unit 708 may calculate a score for each query/URL pair based on their respective features. In one embodiment, the search result ranking unit 708 may rank the URLs based on their corresponding scores and send the ranked URLs with their scores to the search result filter 710 for filtering. Then, the search result filter 710 may determine a threshold to cut off all URLs with scores below the threshold. For example, if the trained ranking model maps features of a bad result to a negative score and map features of a good result to a positive score, the search result filter 710 may utilize a threshold 0 to remove all bad results or bad URLs. The search result filter 710 may then send the filtered and ranked search content as search result to the user in response to the query. In another embodiment (not shown), the search result ranking unit 708 may directly filter or remove a bad result after determining that its score is below the threshold, and then rank the left good results based on their scores. Then, the search result ranking unit 708 may send the filtered and ranked search content as a search result to the user in response to the query.

In one embodiment, the search result ranking unit 708 may store data about the query and the URLs into the training data storage 150, such that the data may be used as training data by the ranking model training engine 308.

Figure 8:
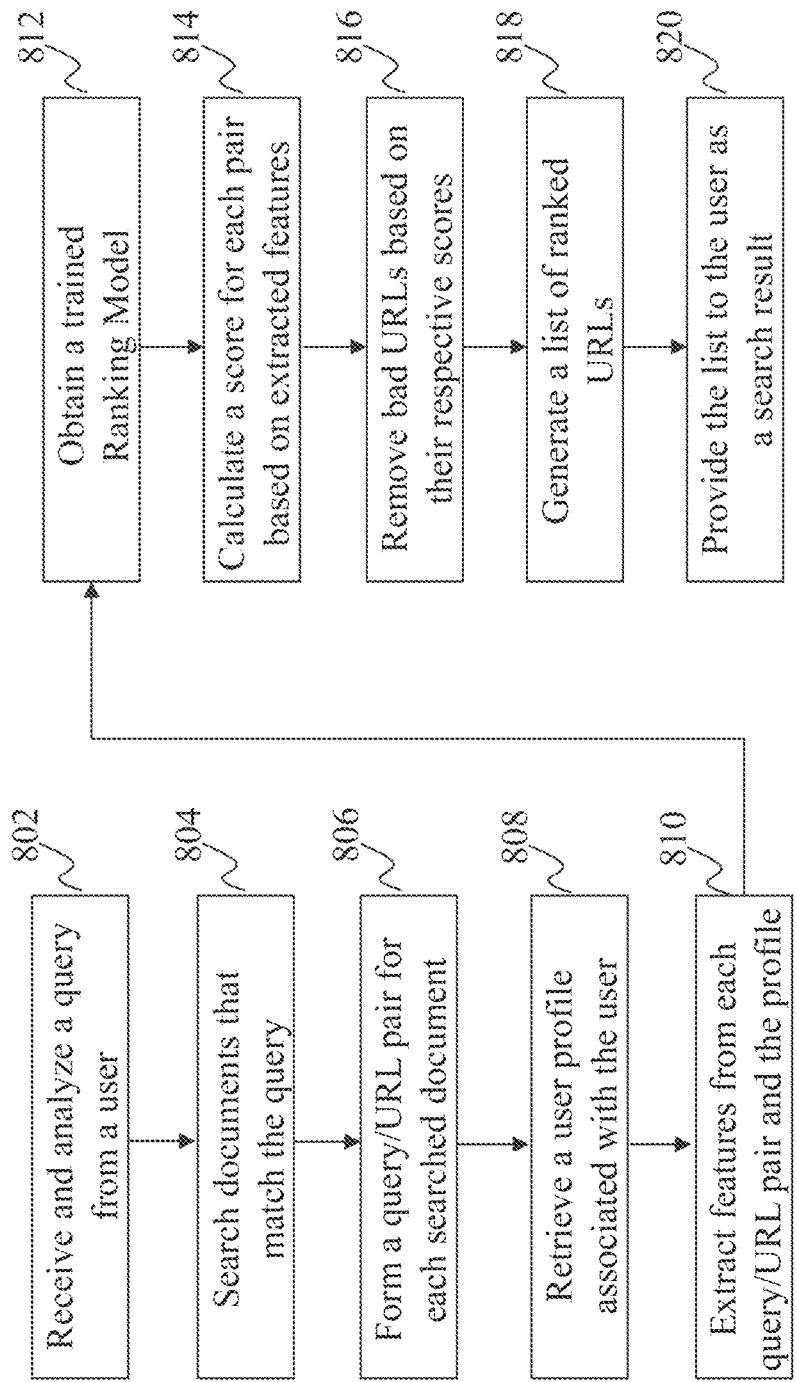
FIG. 8 is a flowchart of an exemplary process performed by a search engine, according to an embodiment of the present teaching.

FIG. 8 is a flowchart of an exemplary process performed by a search engine, e.g. the search engine 530, according to an embodiment of the present teaching. First, a query from a user is received and analyzed at 802. Then at 804, the search engine searches documents that match the query. At 806, a query/URL pair is formed for each searched document. A user profile associated with the user is retrieved at 808. Features are extracted at 810 from each query/URL pair and the user profile. As discussed before, the features may include information about popularity of the URL on the web, textual relevance between a document referred by the URL and the query, and the user's past behavior regarding the URL and the query.

A trained ranking model is obtained at 812. With the trained ranking model, at 814, a score for each query/URL pair is calculated based on its corresponding extracted features. At 816, bad URL(s) are removed based on their respective scores, and a predetermined threshold. Then, a list of ranked URLs is generated at 818, by e g ranking the left good URLs based on their respective scores. At 820, the list is provided to the user as a search result. The steps in FIG. 8 may be performed in a different order as shown therein. For example, 818 may be performed before 416 such that the URLs are ranked at 818 based on their scores and then filtered at 816. In addition, 808 may be performed before 804 such that the search at 804 is performed based on the query and the user profile of the user.

Figure 9:
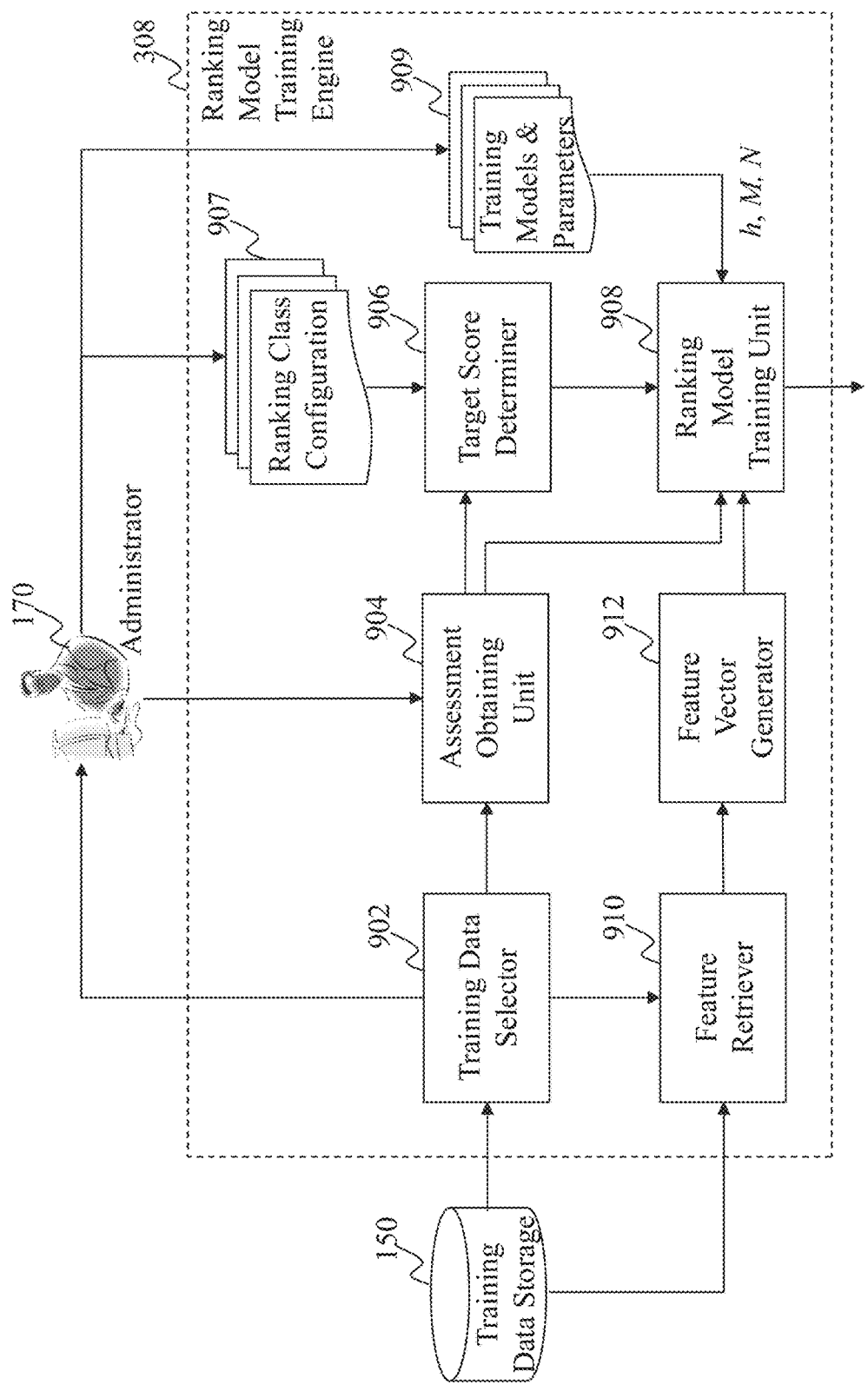
FIG. 9 illustrates an exemplary diagram of a ranking model training engine, according to an embodiment of the present teaching.

FIG. 9 illustrates an exemplary diagram of a ranking model training engine 308, according to an embodiment of the present teaching. In accordance with various embodiments, the ranking model training engine 308 may be located in the ranking engine 140 or stand out as shown in FIG. 5 and FIG. 6. As shown in FIG. 9, the ranking model training engine 308 in this example comprises a training data selector 902, an assessment obtaining unit 904, a target score determiner 906, ranking class configuration 907, a ranking model training unit 908, training models and parameters 909, a feature retriever 910, and a feature vector generator 912.

Figure 10:
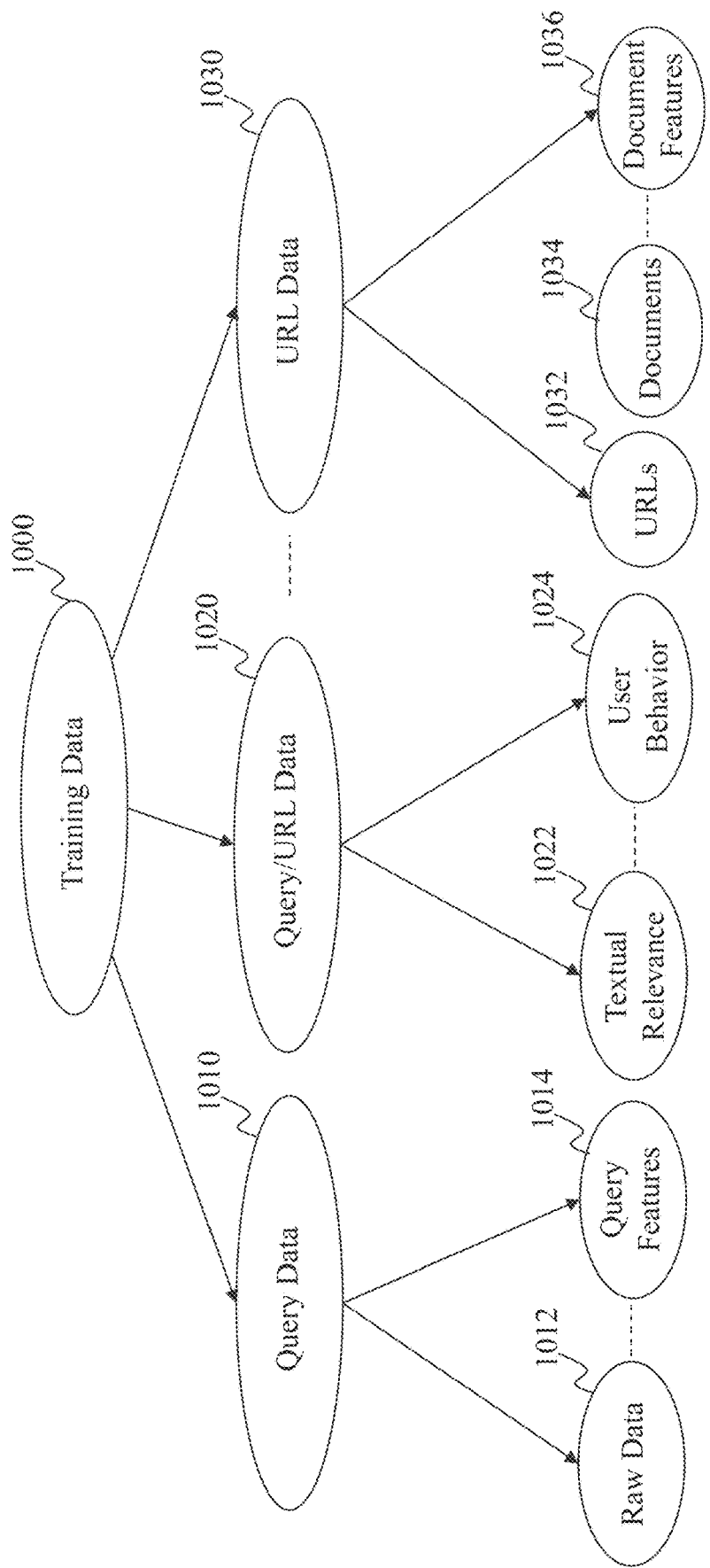
FIG. 10 illustrates exemplary content included in training data, according to an embodiment of the present teaching.

The training data selector 902 in this example selects training data from the training data storage 150, for training a ranking model to be used at a search engine. FIG. 10 illustrates exemplary content included in training data, according to an embodiment of the present teaching. As shown in FIG. 10, the training data 1000 includes query data 1010, query/URL data 1020, URL data 1030, etc. The query data 1010 may include raw data 1012 (like query time, query content, etc.), query feature 1014 (like query topic, query type, etc.), and/or other data related to the query. The URL data 1030 may include URLs 1032, documents 1034 associated with the URLs 1032, document features 1036 (like popularity of a document on the web), and/or other data related to the URLs. The query/URL data 1020 may include textual relevance 1022 (like textual relevance between a query and a corresponding document or URL), user behavior 1024 (like a user's click behavior regarding a URL, browsing behavior regarding a URL, input about a query, etc.), and/or other data related to the query/URL pairs. In one embodiment, the training data 1000 may also include information from users submitted the queries, e.g. the users' demographic information.

Referring back to FIG. 9, the training data selector 902 may select a subset of training data from the training data storage 150. For example, if the ranking model training engine 308 is training a ranking model for a search engine, the training data selector 902 may select training data related to the search engine, e.g. queries submitted to the search engine, URLs searched by the search engine, etc. In one embodiment, the training data selector 902 may send the training data to the administrator 710 for assessing the data. For example, for each query/URL pair, the administrator 170 may give one of the following assessments: "Perfect," "Excellent," "Good," "Fair," and "Bad," based on perceived degree of relevance between the query and the URL. The assessment obtaining unit 904 may receive the assessment from the administrator 170 and associate it with a corresponding query/URL pair received from the training data selector 902. In another embodiment, the training data selected from the training data storage 150 already includes assessment data associated with each query/URL pair, e.g. determined based on previous assessment from the administrator 170 or the user's feedback regarding the URL in the search result. In that case, the training data selector 902 may send the training data to the administrator 710 for double check and confirmation of the assessment. The assessment obtaining unit 904 may then receive the confirmed assessment from the administrator 170 and associate it with a corresponding query/URL pair received from the training data selector 902.

The ranking class configuration 907 in this example includes information about how to classify URLs based on their respective assessment data, e.g. number of classes, scores for each class, etc. The administrator 170 may generate and update the ranking class configuration 907. For example, the ranking class configuration 907 may indicate that the assessments "Perfect," "Excellent," and "Good," should be assigned to "Positive" (+1), and the assessments "Fair," and "Bad," should be assigned to "Negative" (−1).

The target score determiner 906 in this example receives training data samples (e.g. query/URL pairs) with their associated assessment data from the assessment obtaining unit 904. The target score determiner 906 can retrieve information from the ranking class configuration 907 and determine a target score for each training data sample based on the information. Referring to the above example, the target score determiner 906 may determine a target score to be either +1 or −1 for each query/URL pair based on its assessment data. In one embodiment, the administrator 170 may not distinguish between "Fair" and "Bad" when assessing the training data, as both "Fair" and "Bad" URLs will be assigned to −1 and will be removed from the final search result. The target scores are denoted by $y_i$, for i=1, ..., N, where N denotes the number of training data samples.

The feature retriever 910 in this example receives selected training data from the training data selector 902 and retrieves features for each training data sample (e.g. each query/URL pair) from the training data storage 150. As discussed before, the features may include query time, query topic, document feature, textual relevance between the query and the document, user past behavior related to the URL, etc.

The feature vector generator 912 may receive the retrieved features associated with the training data samples from the feature retriever 910 and generate a feature vector for each training data sample. The feature vectors are denoted by $x_i$, for i=1, ..., N, where N denotes the number of training data samples. In one embodiment, the training data selector 902 already retrieves features associated with each selected training data sample and can directly provide the features to the feature vector generator 912 for generating the feature vectors.

The ranking model training unit 908 in this example receives the feature vectors $x_i$ from the feature vector generator 912, the assessment data from the assessment obtaining unit 904, and the target scores $y_i$ from the target score determiner 906, all associated with corresponding training data samples (e.g. query/URL pairs). The ranking model training unit 908 may select a training model and corresponding parameters 909. The training models and parameters 909 includes different training models, e.g. Gradient Boosted Decision Trees (GBDT), AdaBoost, Random forest, etc. for machine learning and their corresponding parameters. The administrator 170 may generate and/or update the training models and their corresponding parameters 909. In one embodiment, the ranking model training unit 908 selects a GBDT training model for finite data, such that the ranking model F(x) is restricted to be a member of a parameterized class of functions: $F(x; \{\beta_m, \alpha_m\}_1^M) = \sum_{m=1}^M \beta_m h(x; \alpha_m)$, wherein the generic function $h(x; \alpha_m)$ is usually a simple parameterized function of the input variables x, characterized by parameters $\alpha = \{\alpha_1, \alpha_2, \ldots\}$, and wherein M denotes the maximum number of iterations for the training algorithm.

The ranking model training unit 908 can train the ranking model with the target scores $y_i$ and feature vectors $x_i$ to obtain the trained ranking model F(x), and provide F(x) either to the search result ranking unit 306 or to the search engine 530 for ranking search results, according to different embodiments.

Figure 11:
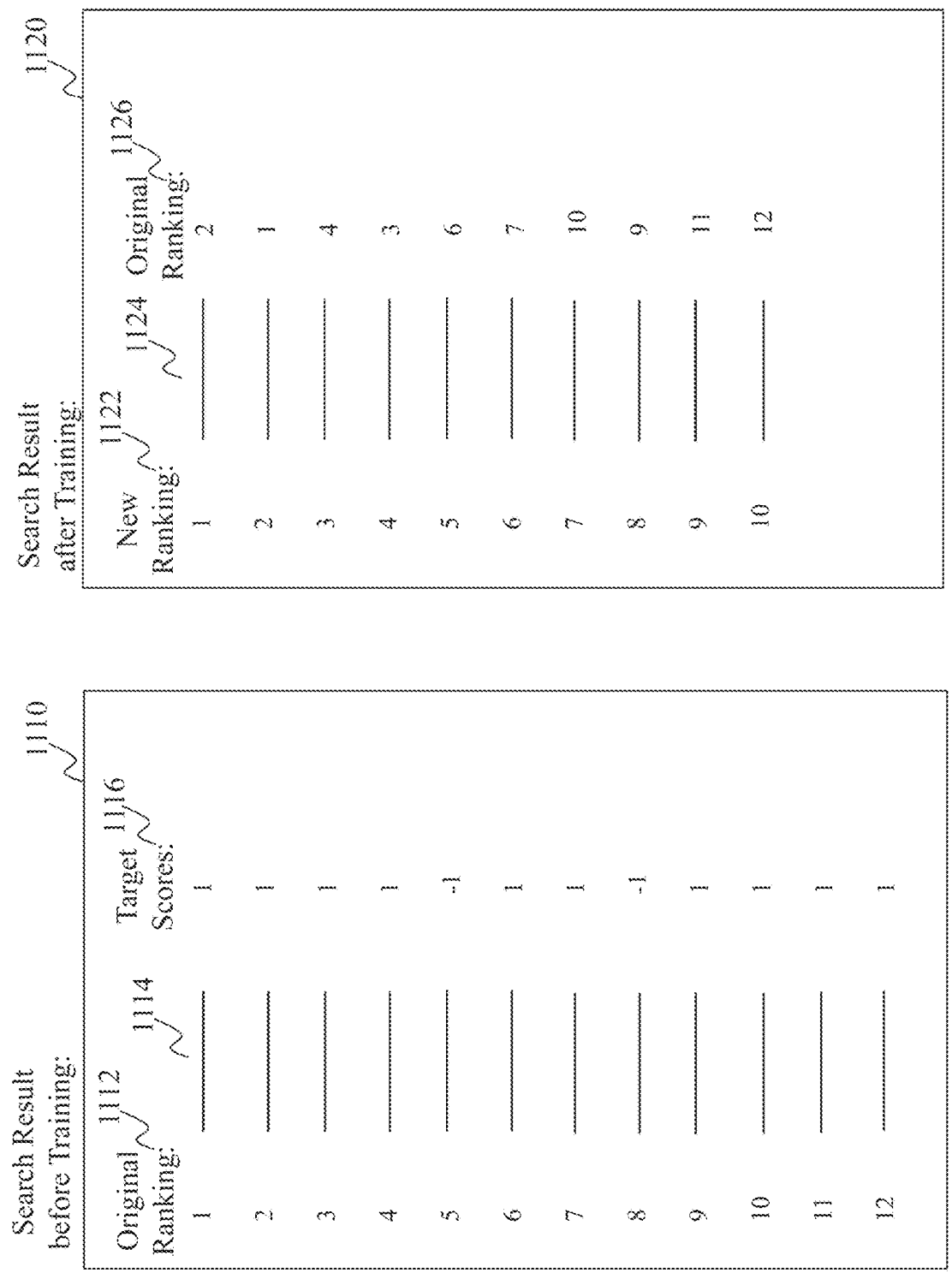
FIG. 11 illustrates exemplary search results before and after training, according to an embodiment of the present teaching.

The trained ranking model F(x) developed in the present teaching may remove bad search results and rank good search results at the same time. FIG. 11 illustrates exemplary search results provided by a search engine to a user before and after training, according to an embodiment of the present teaching. As shown in FIG. 11, the search result before training 1110 includes ranked documents 1114 each with an original ranking 1112, before applying the trained ranking model F(x). The target scores 1116 for the documents 1114 are listed on the right side of corresponding documents. As discussed before, the target scores 1116 may be determined based on assessment data from the administrator 170 and ranking class configuration 907 of the system. As shown in FIG. 11, there are two bad search results ($5^{th}$ and $8^{th}$) in the top ten ranking positions before training. This may severely hurt the user's feeling about the search engine, even if the other search results in the top ten ranking positions are very good.

The search result after training 1120 includes ranked documents 1124 each with a new ranking 1122 and a corresponding original ranking 1126, after applying the trained ranking model F(x). As shown in FIG. 11, the two bad search results ($5^{th}$ and $8^{th}$) have been removed from the result after training. As discussed before, the trained ranking model F(x) also ranks the left good search results at the same time. Therefore, the new ranking may be a little different from the original ranking, as shown in FIG. 11. By applying the trained ranking model F(x), the search engine now provides the user only good search results, especially at the top positions.

Figure 12:
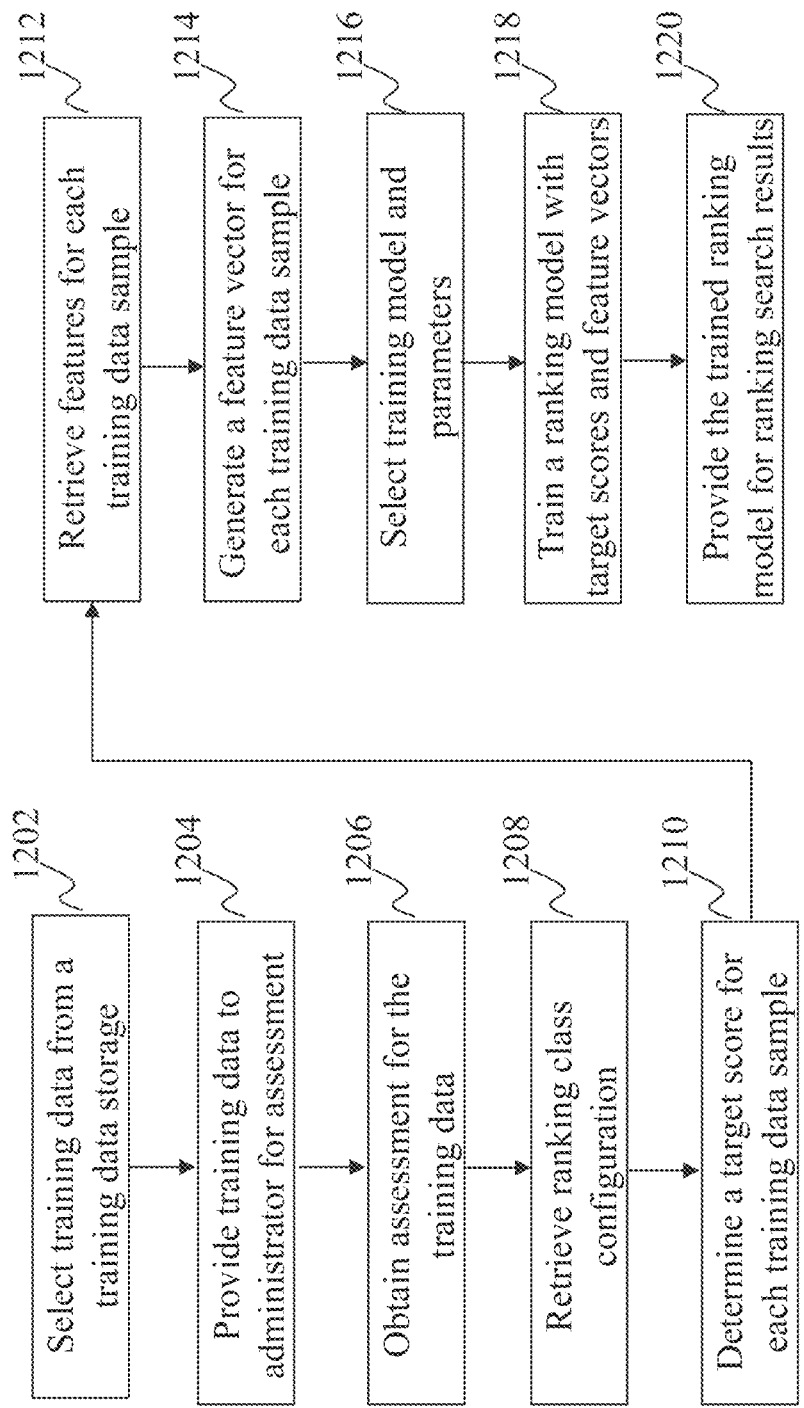
FIG. 12 is a flowchart of an exemplary process performed by a ranking model training engine, according to an embodiment of the present teaching.

FIG. 12 is a flowchart of an exemplary process performed by a ranking model training engine, e.g. the ranking model training engine 308, according to an embodiment of the present teaching. First, training data is selected from a training data storage at 1202. Training data is then provided at 1204 to an administrator or a system operator for assessment. At 1206, assessment data for the training data is obtained. Then, ranking class configuration is retrieved at 1208 to obtain a classifying strategy. A target score is determined at 1210 for each training data sample, e.g. each query/URL pair, based on the classifying strategy.

At 1212, features are retrieved for each training data sample. For example, the features may include data about each query/URL pair like query time, query topic, document feature, textual relevance between the query and the document, user past behavior related to the URL, etc. A feature vector is then generated at 1214 for each training data sample. At 1216, a training model and its corresponding parameters are selected for training. At 1218, a ranking model is trained with target scores and feature vectors, based on the training model. The trained ranking model is provided at 1220 either to the search result ranking unit 306 or to the search engine 530 for ranking search results, according to different embodiments described before.

Figure 13:
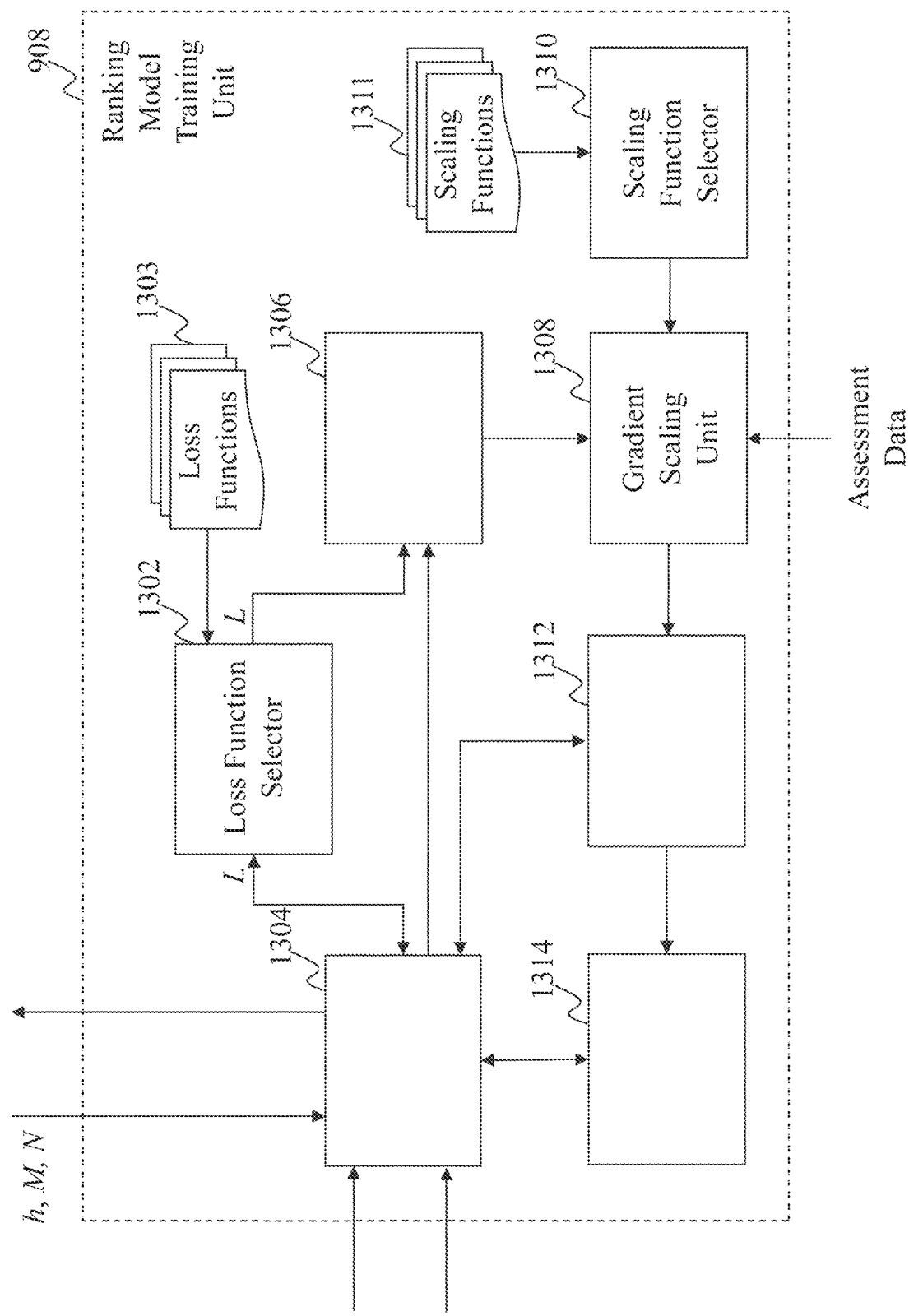
FIG. 13 illustrates an exemplary diagram of a ranking model training unit, according to an embodiment of the present teaching.

FIG. 13 illustrates an exemplary diagram of a ranking model training unit 908, according to an embodiment of the present teaching. As shown in FIG. 13, the ranking model training unit 908 in this example includes a loss function selector 1302, loss functions 1303, a ranking model $F_m(x)$ generator/updater 1304, a gradient-$g_m(x_i)$ generator/updater 1306, a gradient scaling unit 1308, a scaling function selector 1310, scaling functions 1311, a vector $\alpha_m$ generator/updater 1312, and a parameter $\beta_m$ generator/updater 1314.

Below, an exemplary method called "Gradient Scaling-logistic" is disclosed for training the ranking model F(x)

---

Method: Gradient Scaling-logistic

1: Obtain input parameters $x_i$, $y_i$, h, N, M,
2: Select the logistic loss function $L(y, F) = \log(1 + \exp(-yF))$, $y \in \{1, -1\}$
3: Calculate $F_0(x) = \arg\min_\beta \sum_{i=1}^N L(y_i, \beta)$.
4: For m = 1 to M, do:
5: 
$$-g_m(x_i) = -\left[\frac{\partial L(y_i, F(x_i))}{\partial F(x_i)}\right]_{F(x)=F_{m-1}(x)} = y_i / (1 + \exp(y_i F_{m-1}(x_i)))$$
6: Scale $-g_m(x_i)$ based on assessment data:
$$S(-g_m(x_i)) = \begin{cases} -g_m(x_i) \times 3 & \text{Perfect} \\ -g_m(x_i) \times 2 & \text{Excellent} \\ -g_m(x_i) \times 1 & \text{Other} \end{cases}$$
7: $\alpha_m = \arg\min_{\alpha, \beta} \sum_{i=1}^N [S(-g_m(x_i)) - \beta h(x_i; \alpha)]^2$
8: $\beta_m = \arg\min_\beta \sum_{i=1}^N L(y_i, F_{m-1}(x_i) + \beta h(x_i; \alpha_m))$
9: $F_m(x) = F_{m-1}(x) + \beta_m h(x; \alpha_m)$
10: end For

---

This Gradient Scaling-logistic method may be realized by the ranking model training unit 908. The ranking model $F_m(x)$ generator/updater 1304 in this example obtains feature vectors $x_i$, target scores $y_i$ corresponding to $x_i$, and the parameters for the training model GBDT, e.g. the generic function $h(x; \alpha_m)$, the maximum number of iterations M, and the number of data samples N.

The loss function selector 1302 in this example selects one of the loss functions 1303. The loss functions 1303 may include squared-error, absolute error, hinge loss, logistic loss, etc. To classify the search results into two classes, the loss function selector 1302 may select either the logistic loss function or the hinge loss function. In this example, the loss function selector 1302 selects the logistic loss function, because logistic loss is not limited to classification, but also able to provide relative good ranking, compared to hinge loss. Unlike hinge loss, logistic loss always places force on a positive/negative value towards positive/negative infinite. For data samples that are far apart from decision boundary, the predicted values usually have large absolute value, i.e. very positive or very negative. For instance, "Perfect" samples are usually far apart from decision boundary, and hence the predicted values are larger than the samples which are closer to decision boundary, e.g. "Good". As such, logistic loss actually provides an order to some extension such that the "Perfect" and "Excellent" results are ranked high enough for the contextual re-ranking if needed.

The log likelihood function for logistic loss is:

$$L(y, F) = \log(1 + \exp(-yF)), y \in \{1, -1\}$$

where y denotes the target score and F denotes the ranking model to be trained. The loss function selector 1302 may send the selected loss function L to the ranking model $F_m(x)$ generator/updater 1304 and the gradient-$g_m(x_i)$ generator/updater 1306.

Based on the obtained information and the selected loss function, the ranking model $F_m(x)$ generator/updater 1304 may first calculate an initial value $F_0(x)$ of the ranking model, based on the following equation:

$$F_0(x) = \arg\min_\beta \Sigma_{i=1}^N L(y_i, \beta)$$

where L is the logistic loss function described before.

Then for m=1 to M, the ranking model $F_m(x)$ generator/updater 1304 may send the $F_m(x)$ to the gradient-$g_m(x_i)$ generator/updater 1306, the vector $\alpha_m$ generator/updater 1312, and the parameter $\beta_m$ generator/updater 1314 to update the corresponding parameters. Based on the updated parameters, the ranking model $F_m(x)$ generator/updater 1304 may update the ranking model $F_m(x)$ until m=M, and then provide the trained ranking model $F_M(x)$, either to the search result ranking unit 306 or to the search engine 530 for ranking search results, according to different embodiments.

The gradient-$g_m(x_i)$ generator/updater 1306 in this example calculates or updates a gradient-$g_m(x_i)$ for each query/URL pair. With the logistic loss function, the gradient is calculated as the following:

$$-g_m(x_i) = -\left[\frac{\partial L(y_i, F(x_i))}{\partial F(x_i)}\right]_{F(x)=F_{m-1}(x)} = y_i/(1+\exp(y_i F_{m-1}(x_i))).$$

The gradient scaling unit 1308 in this example may scale the gradient-$g_m(x_i)$ based on assessment data associated with the query/URL pair. The above Gradient Scaling-logistic method describes an exemplary scaling function:

$$S(-g_m(x_i)) = \begin{cases} -g_m(x_i) \times 3 & \text{Perfect} \\ -g_m(x_i) \times 2 & \text{Excellent} \\ -g_m(x_i) \times 1 & \text{Other} \end{cases}$$

where the gradient is scaled by 3 for "Perfect" URLs, scaled by 2 for "good" URLs, and scaled by 1 (not scaled) for other URLs. In various embodiments, the gradient scaling unit 1308 may use different scaling functions to scale the gradient-$g_m(x_1)$.

The scaling function selector 1310 may select one of the scaling functions 1312 for the gradient scaling unit 1308. For example, a different scaling function may scale the gradient-$g_m(x_i)$ by a different number than shown above. A different scaling function may also be selected for a different assessment strategy, e.g. when 10 assessment levels are applied to the URLs.

The idea behind gradient scaling may be that given a data sample that is "Perfect," "Excellent," or "Good," the gradient is always positive based on the above ranking class configuration. To distinguish them (Perfect/Excellent/Good), the system may scale the gradient in different levels (e.g. 3 for Perfect, 2 for Excellent, and 1 for Good). As a result, the output of the GBDT for Perfect data samples will get relatively higher forces to positive infinite than Excellent and Good; while the Excellent ones are higher than the Good ones.

The vector $\alpha_m$ generator/updater 1312 in this example calculates or updates the vector $\alpha_m$ based on the scaled gradient S $(-g_m(x_i))$ according to the following equation:

$$\alpha_m = \arg\min_{\alpha,\beta} \Sigma_{i=1}^N [S(-g_m(x_i)) - \beta h(x_i;\alpha)]^2.$$

The parameter $\beta_m$ generator/updater 1314 in this example calculates or updates the parameter $\beta_m$ based on the calculated vector $\alpha_m$ according to the following equation:

$$\beta_m = \arg\min_\beta \Sigma_{i=1}^N L(y_i, F_{m-1}(x_i) + \beta h(x_i;\alpha_m)).$$

The ranking model $F_m(x)$ generator/updater 1304 may then calculate an updated ranking model $F_m(x)$ according to the following equation:

$$F_m(x) = F_{m-1}(x) + \beta_m h(x;\alpha_m)$$

The ranking model $F_m(x)$ generator/updater 1304 determines whether m is equal to M. If so, the ranking model $F_m(x)$ generator/updater 1304 provides the $F_M(x)$ as the trained ranking model, either to the search result ranking unit 306 or to the search engine 530 for ranking search results, according to different embodiments described before. If not, the ranking model $F_m(x)$ generator/updater 1304 increases m by 1, and sends the $F_m(x)$ to the gradient-$g_m(x_i)$ generator/updater 1306, the vector $\alpha_m$ generator/updater 1312, and the parameter $\beta_m$ generator/updater 1314 to update the corresponding parameters.

Figure 14:
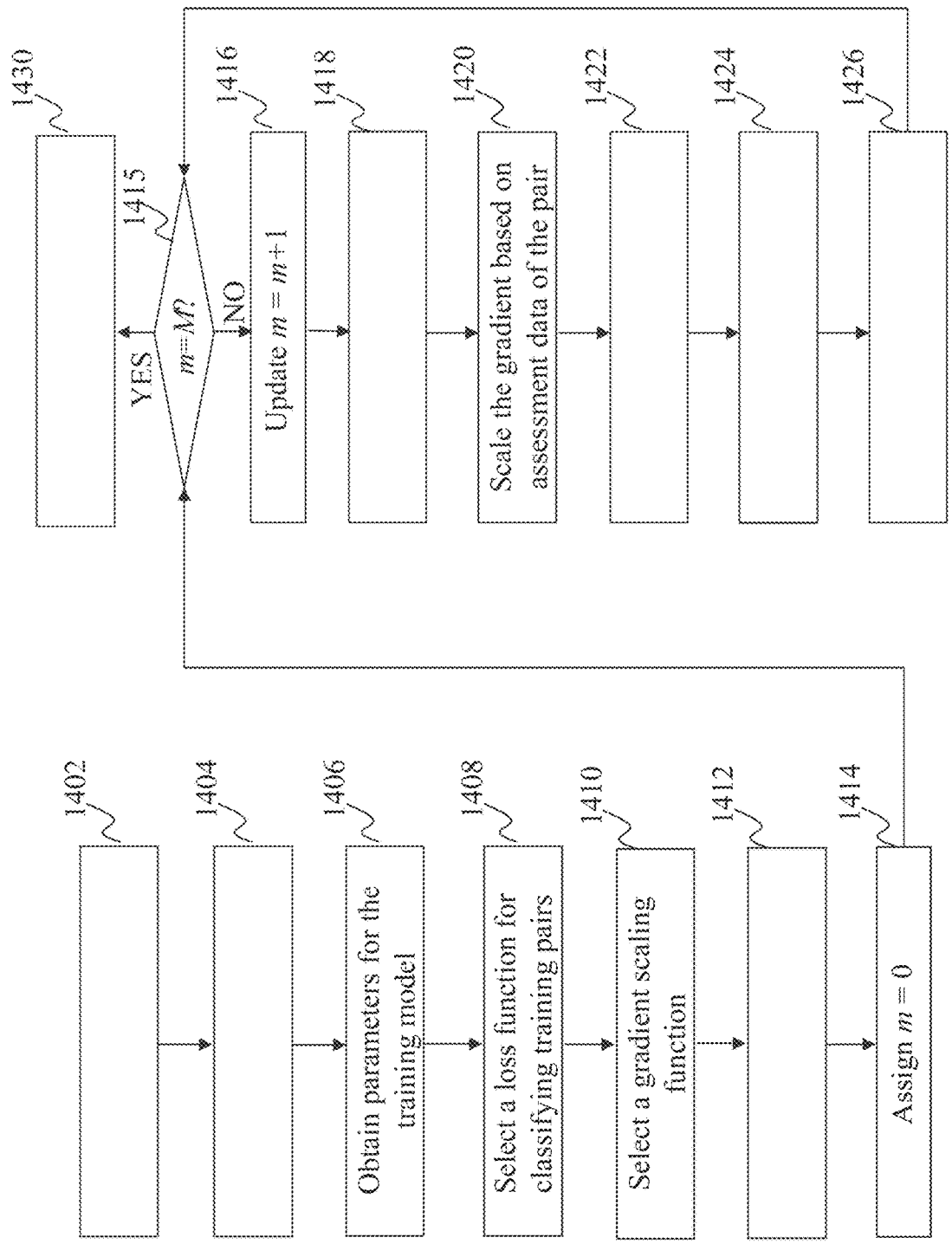
FIG. 14 is a flowchart of an exemplary process performed by a ranking model training unit, according to an embodiment of the present teaching.

FIG. 14 is a flowchart of an exemplary process performed by a ranking model training unit, e.g. the ranking model training unit 908, according to an embodiment of the present teaching. First, feature vectors $x_i$ are obtained for the training dataset at 1402. Then, target scores $y_i$ corresponding to $x_i$ are obtained at 1404 for the training dataset. At 1406, parameters for the training model are obtained. For example, for GBDT, the generic function h(x; $\alpha_m$), the maximum number of iterations M, and the number of data samples N are obtained.

A loss function is selected for classifying training pairs at 1408. A gradient scaling function is selected for scaling the gradient at 1410. An initial value $F_0(x)$ of the ranking model is calculated at 1412. At 1414, m is assigned an initial value 0.

At 1415, it is determined whether m is equal to M. If so, the process goes to 1430, where $F_M(x)$ is provided as the trained ranking model. If not, the process goes to 1416, where m is increased by 1. Then at 1418, a gradient-$g_m(x_i)$ is calculated for each query/URL pair. The gradient-$g_m(x_i)$ is scaled at 1420 based on assessment data of the query/URL pair. At 1422, vector $\alpha_m$ is calculated based on the scaled gradient $S(-g_m(x_i))$. At 1424, parameter $\beta_m$ is calculated based on the calculated vector $\alpha_m$. At 1426, an updated ranking model $F_m(x)$ is calculated based on $F_{m-1}(x)$, vector $\alpha_m$, and parameter $\beta_m$. The process then goes back to 1415 to check m again.

Figure 15:
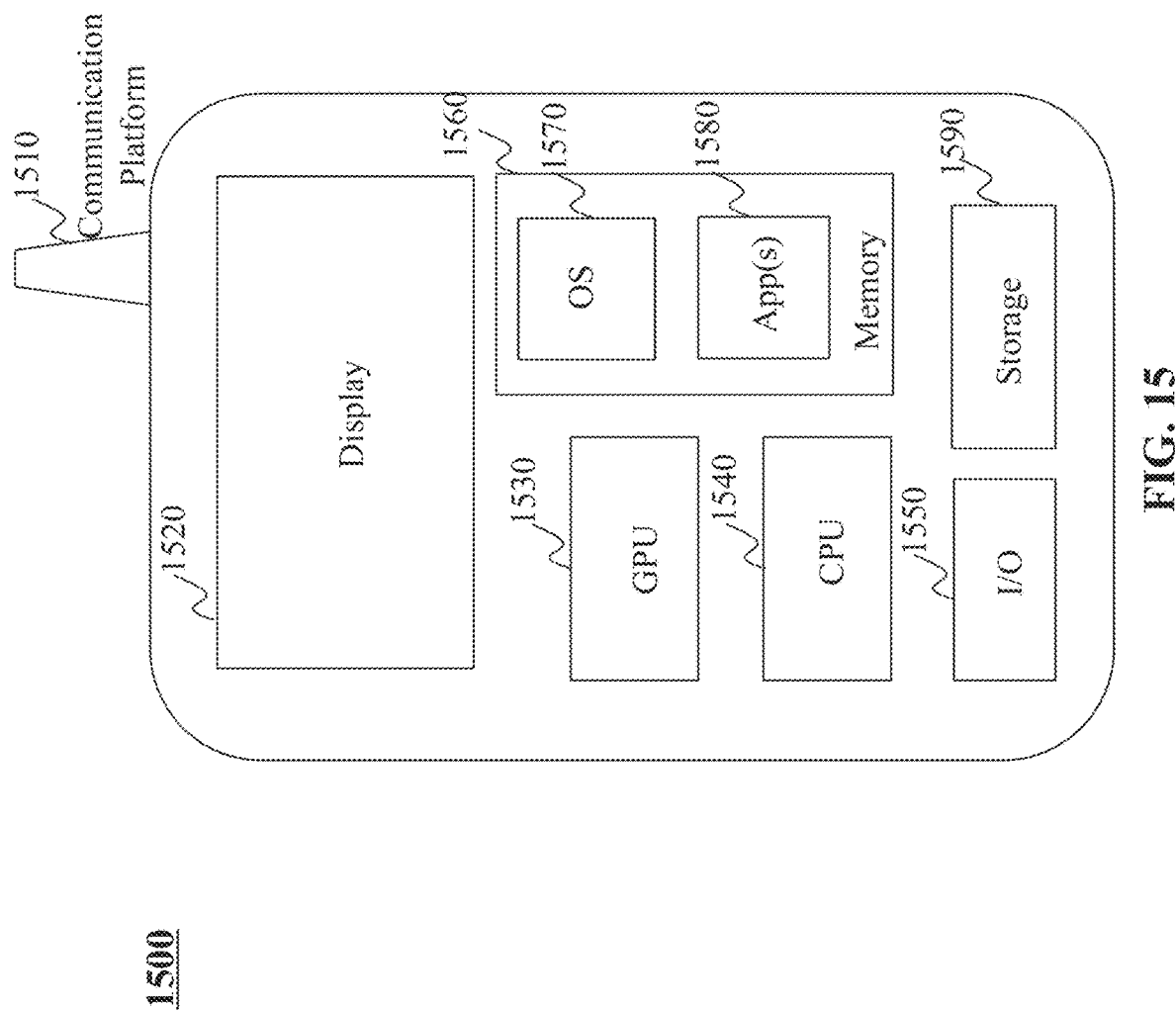
FIG. 15 depicts the architecture of a mobile device which can be used to implement a specialized system incorporating the present teaching.

FIG. 15 depicts the architecture of a mobile device which can be used to realize a specialized system implementing the present teaching. In this example, the user device on which ranked search results are presented and interacted-with is a mobile device 1500, including, but not limited to, a smart phone, a tablet, a music player, a handled gaming console, a global positioning system (GPS) receiver, and a wearable computing device (e.g., eyeglasses, wrist watch, etc.), or in any other form factor. The mobile device 1500 in this example includes one or more central processing units (CPUs) 1540, one or more graphic processing units (GPUs) 1530, a display 1520, a memory 1560, a communication platform 1510, such as a wireless communication module, storage 1590, and one or more input/output (I/O) devices

1550. Any other suitable component, including but not limited to a system bus or a controller (not shown), may also be included in the mobile device 1500. As shown in FIG. 15, a mobile operating system 1570, e.g., iOS, Android, Windows Phone, etc., and one or more applications 1580 may be loaded into the memory 1560 from the storage 1590 in order to be executed by the CPU 1540. The applications 1580 may include a browser or any other suitable mobile apps for search result ranking on the mobile device 1500. User interactions with the user interface 1300, 1400, 1500, 1600, 1700 or 1800 may be achieved via the I/O devices 1550 and provided to the ranking engine 140 and/or the ranking model training engine 308 via the network 120.

To implement various modules, units, and their functionalities described in the present disclosure, computer hardware platforms may be used as the hardware platform(s) for one or more of the elements described herein (e.g., the search engine 130 and/or the ranking engine 140 and other components of systems 100 and 200 described with respect to FIGS. 1-14; or the search engine 530 and/or the ranking model training engine 308 and other components of systems 500 and 600 described with respect to FIGS. 1-14). The hardware elements, operating systems and programming languages of such computers are conventional in nature, and it is presumed that those skilled in the art are adequately familiar therewith to adapt those technologies to generate and execute search result ranking as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 16:
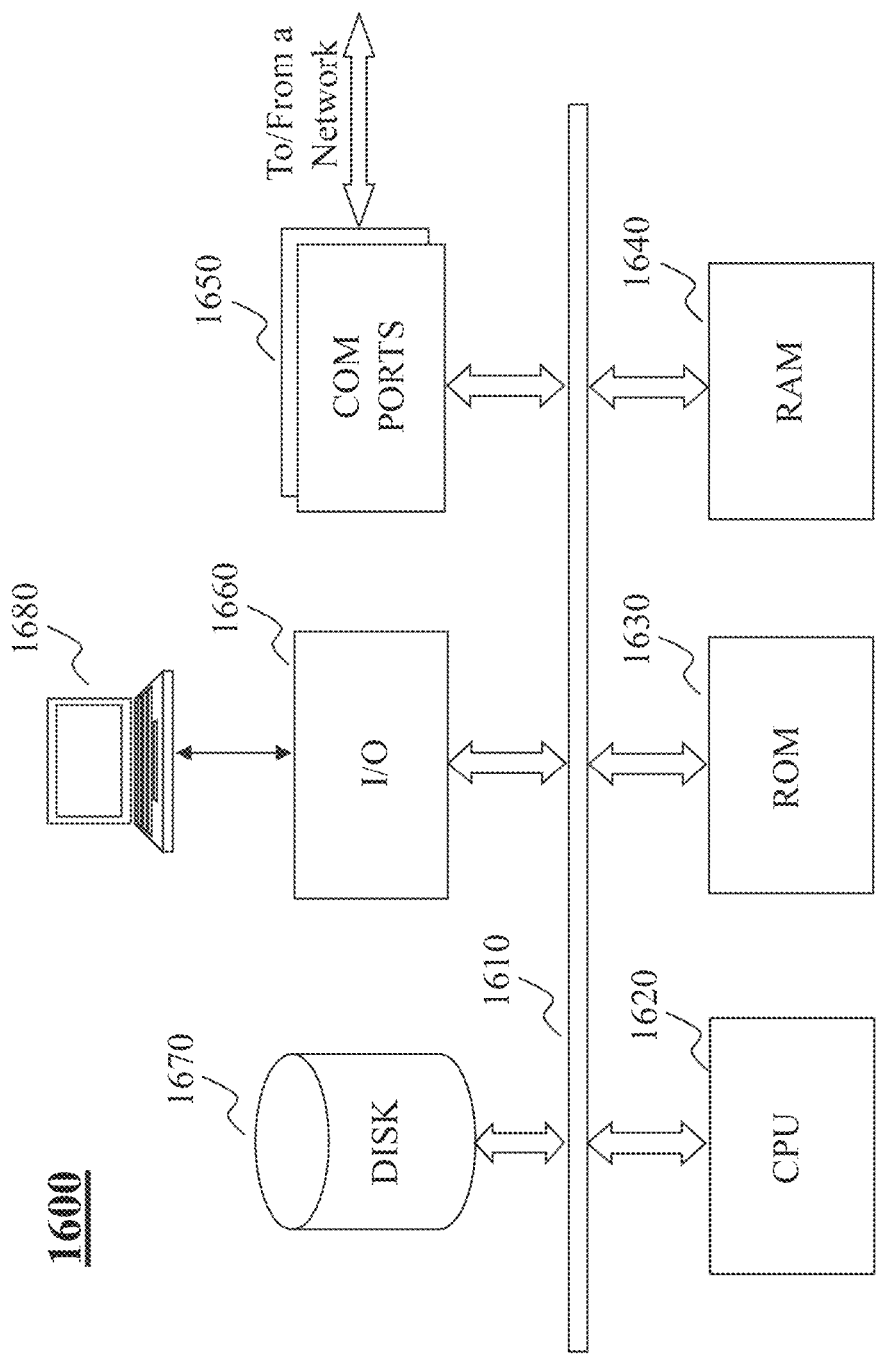
FIG. 16 depicts the architecture of a computer which can be used to implement a specialized system incorporating the present teaching.

FIG. 16 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1600 may be used to implement any component of the learning to rank techniques, as described herein. For example, the ranking model training engine 308 and/or the ranking engine 140 may be implemented on a computer such as computer 1600, via its hardware, software program, firmware, or a combination thereof. Although only one such computer is shown, for convenience, the computer functions relating to training a ranking model as described herein may be implemented in a distributed fashion on a number of similar platforms, to distribute the processing load.

The computer 1600, for example, includes COM ports 1650 connected to and from a network connected thereto to facilitate data communications. The computer 1600 also includes a central processing unit (CPU) 1620, in the form of one or more processors, for executing program instructions. The exemplary computer platform includes an internal communication bus 1610, program storage and data storage of different forms, e.g., disk 1670, read only memory (ROM) 1630, or random access memory (RAM) 1640, for various data files to be processed and/or communicated by the computer, as well as possibly program instructions to be executed by the CPU. The computer 1600 also includes an I/O component 1660, supporting input/output flows between the computer and other components therein such as user interface elements 1680. The computer 1600 may also receive programming and data via network communications.

Hence, aspects of the methods of search result ranking, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a ranking engine or ranking model training engine into the hardware platform(s) of a computing environment or other system implementing a computing environment or similar functionalities in connection with search result ranking Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the search result ranking as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one
  processor, storage, and a communication platform connected to a network for ranking search content, comprising:
  receiving, by a computing device, a plurality of documents to be ranked with respect to a query, wherein each of the plurality of documents is represented by a corresponding uniform resource locator (URL);
  extracting, by the computing device, features from the query, the plurality of documents, and a user profile;
  obtaining assessment data associated with a plurality of query/URL pairs, wherein the plurality of query/URL pairs is classified into two groups: a first group including query/URL pairs each of which has a first score representing a higher relevance between query and URL in the pair, and a second group including query/URL pairs each of which has a second score representing a lower relevance between query and URL in the pair;
  assigning one of the first and second scores for each of the plurality of query/URL pairs based on the assessment data;
  retrieving features of each of the plurality of query/URL pairs from a database;
  training, by the computing device, via machine learning, based on the first and second scores and the features of each of the plurality of query/URL pairs, a ranking model for ranking the plurality of URLs to map the features of the query/URL pair;
  ranking, by the computing device based on the ranking model, the plurality of URLs by:
    classifying the plurality of URLs into different classes based on the extracted features, wherein multiple URLs classified in first multiple of the different classes are deemed relevant to the query and multiple URLs classified in second multiple of the different classes are deemed irrelevant to the query,
    assigning the first score to each of the multiple URLs classified in the first multiple classes such that all of the multiple URLs classified in the first multiple classes correspond to the same first score and assigning the second score to each of the multiple URLs classified in the second multiple classes such that all of the multiple URLs classified in the second multiple classes correspond to the same second score,
    removing, based on the second scores, the multiple URLs classified in the second multiple classes, and ranking the remaining URLs;
  providing, by the computing device via a computer application to a user, content represented by the ranked remaining URLs as search results with respect to the query;
  obtaining, by the computing device via the computer application, interactions of the user with respect to the search results; and
  updating, by the computing device, the ranking model via training based on the interactions.

2. The method of claim 1, wherein each of the first and second scores represents a degree of relevance between the query and each of the plurality of documents, wherein each of the first and second scores is calculated based on the ranking model and the extracted features; and
  wherein the step of removing comprises filtering out the one or more URLs from the plurality of URLs that have scores less than a predetermined threshold.

3. The method of claim 1, wherein the features extracted from the query and the plurality of documents represent at least one of the following:
  a popularity online for each of the plurality of documents, and
  a textual relevance between each document and the query.

4. The method of claim 1, wherein the extracted features include past user behavior related to the plurality of URLs.

5. A system having at least one processor, storage, and a communication platform connected to a network for ranking search content, comprising:
  a query and document analyzer configured for receiving a plurality of documents to be ranked with respect to a query, wherein each of the plurality of documents is represented by a corresponding uniform resource locator (URL);
  a feature extractor configured for extracting features from the query, the plurality of documents, and a user profile;
  a ranking model training engine configured for:
    obtaining assessment data associated with a plurality of query/URL pairs, wherein the plurality of query/URL pairs is classified into two groups: a first group including query/URL pairs each of which has a first score representing a higher relevance between query and URL in the pair, and a second group including query/URL pairs each of which has a second score representing a lower relevance between query and URL in the pair;
    assigning one of the first and second scores for each of the plurality of query/URL pairs based on the assessment data;
    retrieving features of each of the plurality of query/URL pairs from a database; and
    training, via machine learning based on the first and second scores and the features of each of the plurality of query/URL pairs, a ranking model for ranking the plurality of URLs to map the features of the query/URL pair;
  a search result ranking unit configured for ranking, based on the ranking model, the plurality of URLs by:
    classifying the plurality of URLs into different classes based on the extracted features, wherein multiple URLs classified in first multiple of the different classes are deemed relevant to the query and multiple URLs classified in second multiple of the different classes are deemed irrelevant to the query, assigning the first score to each of the multiple URLs classified in the first multiple classes such that all of the multiple URLs classified in the first multiple classes correspond to the same first score and assigning the second score to each of the multiple URLs classified in the second multiple classes such that all of the multiple URLs classified in the second multiple classes correspond to the same second score, removing, based on the second scores, the multiple URLs classified in the second multiple classes, and ranking the remaining URLs; and a search result filter configured for providing, via a computer application to a user, content represented by the ranked remaining URLs as search results with respect to the query, and obtaining, via the computer application, interactions of the user with respect to the search results, wherein the ranking model training engine is further configured to update the ranking model via training based on the interactions.

6. The system of claim 5, wherein:

each of the first and second scores represents a degree of relevance between the query and each of the plurality of documents, wherein each of the first and second scores is calculated based on the ranking model and the extracted features; and the search result filter is configured for filtering out the one or more URLs from the plurality of URLs that have scores less than a predetermined threshold.

7. The system of claim 5, wherein the features extracted from the query and the plurality of documents represent at least one of the following:

a popularity online for each of the plurality of documents, and a textual relevance between each document and the query.

8. The system of claim 5, wherein the extracted features include past user behavior related to the plurality of URLs.

9. A machine-readable, non-transitory and tangible medium having information recorded thereon for ranking search content, the information, when read by the machine, causes the machine to perform the following:

receiving a plurality of documents to be ranked with respect to a query, wherein each of the plurality of documents is represented by a corresponding uniform resource locator (URL);

extracting features from the query, the plurality of documents, and a user profile;

obtaining assessment data associated with a plurality of query/URL pairs, wherein the plurality of query/URL pairs is classified into two groups: a first group including query/URL pairs each of which has a first score representing a higher relevance between query and URL in the pair, and a second group including query/URL pairs each of which has a second score representing a lower relevance between query and URL in the pair;

assigning one of the first and second scores for each of the plurality of query/URL pairs based on the assessment data;

retrieving features of each of the plurality of query/URL pairs from a database;

training, via machine learning, based on the first and second scores and the features of each of the plurality of query/URL pairs, a ranking model for ranking the plurality of URLs to map the features of the query/URL pair;

ranking, based on the ranking model, the plurality of URLs by:

classifying the plurality of URLs into different classes based on the extracted features, wherein multiple URLs classified in first multiple of the different classes are deemed relevant to the query and multiple URLs classified in second multiple of the different classes are deemed irrelevant to the query, assigning the first score to each of the multiple URLs classified in the first multiple classes such that all of the multiple URLs classified in the first multiple classes correspond to the same first score and assigning the second score to each of the multiple URLs classified in the second multiple classes such that all of the multiple URLs classified in the second multiple classes correspond to the same second score, removing, based on the second scores, the multiple URLs classified in the second multiple classes, and ranking the remaining URLs;

providing, via a computer application to a user, content represented by the ranked remaining URLs as search results with respect to the query;

obtaining, via the computer application, interactions of the user with respect to the search results; and updating the ranking model via training based on the interactions.

10. The medium of claim 9, wherein each of the first and second scores represents a degree of relevance between the query and each of the plurality of documents, wherein each of the first and second scores is calculated based on the ranking model and the extracted features; and wherein the information, when read by the machine, further cause the machine to remove the one or more of the plurality of URLs by filtering out the one or more URLs from the plurality of URLs that have scores less than a predetermined threshold.

11. The medium of claim 9, wherein the features extracted from the query and the plurality of documents represent at least one of the following:

a popularity online for each of the plurality of documents, and a textual relevance between each document and the query.

12. The medium of claim 9, wherein the extracted features include past user behavior related to the plurality of URLs.

* * * * *